(12) United States Patent
Yamamoto

(10) Patent No.: US 12,442,986 B2
(45) Date of Patent: Oct. 14, 2025

(54) OPTICAL WAVEGUIDE ELEMENT AND OPTICAL AXIS ADJUSTMENT METHOD

(71) Applicant: Mitsubishi Electric Corporation, Tokyo (JP)

(72) Inventor: Shuhei Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 85 days.

(21) Appl. No.: 18/252,496

(22) PCT Filed: Jan. 19, 2021

(86) PCT No.: PCT/JP2021/001611
§ 371 (c)(1),
(2) Date: May 10, 2023

(87) PCT Pub. No.: WO2022/157820
PCT Pub. Date: Jul. 28, 2022

(65) Prior Publication Data
US 2023/0408770 A1      Dec. 21, 2023

(51) Int. Cl.
*G02B 6/35*      (2006.01)
*F21V 8/00*      (2006.01)

(52) U.S. Cl.
CPC ........... *G02B 6/359* (2013.01); *G02B 6/0036* (2013.01); *G02B 6/3526* (2013.01); *G02B 6/3598* (2013.01)

(58) Field of Classification Search
None
See application file for complete search history.

(56) References Cited

U.S. PATENT DOCUMENTS

| 6,345,138 B1 | 2/2002 | Kawai et al. |
| 2001/0026670 A1* | 10/2001 | Takizawa ............... G02B 6/132 385/132 |

(Continued)

FOREIGN PATENT DOCUMENTS

| JP | H01-128014 A | 5/1989 |
| JP | H04-067103 A | 3/1992 |

(Continued)

OTHER PUBLICATIONS

International Search Report issued in PCT/JP2021/001611; mailed Apr. 13, 2021.

(Continued)

*Primary Examiner* — Jerry Rahll
(74) *Attorney, Agent, or Firm* — Studebaker Brackett PLLC

(57) ABSTRACT

An optical waveguide element of the present disclosure includes: a waveguide for propagating light; a clad including an upper clad whose lower surface is in contact with one surface of the waveguide and whose upper surface exposed to the outside is formed with a rough surface, and a lower clad whose upper surface is in contact with the other surface of the waveguide and whose lower surface is formed with a reflective surface; an incident end surface provided at one end of the waveguide and the clad; and an emission end surface provided at the other end of the waveguide and the clad, whereby incident light is optically coupled to the waveguide with high efficiency.

8 Claims, 18 Drawing Sheets

(56) References Cited

U.S. PATENT DOCUMENTS

| | | | |
|---|---|---|---|
| 2004/0037532 A1* | 2/2004 | Park | G02B 6/30 |
| | | | 385/131 |
| 2004/0076394 A1* | 4/2004 | Carniel | G02B 6/1228 |
| | | | 385/129 |
| 2017/0017036 A1 | 1/2017 | Botheroyd | |
| 2017/0160468 A1* | 6/2017 | Yanagisawa | G02B 6/132 |

FOREIGN PATENT DOCUMENTS

| | | |
|---|---|---|
| JP | H05-248991 A | 9/1993 |
| JP | H06-281850 A | 10/1994 |
| JP | H07-301537 A | 11/1995 |
| JP | H08-037341 A | 2/1996 |
| JP | H08-171020 A | 7/1996 |
| JP | 2001-083374 A | 3/2001 |
| JP | 2001-343543 A | 12/2001 |
| JP | 2003-185854 A | 7/2003 |
| JP | 2004-199032 A | 7/2004 |
| JP | 2011-059539 A | 3/2011 |
| JP | 2012-198488 A | 10/2012 |
| JP | 2017-102312 A | 6/2017 |

OTHER PUBLICATIONS

"Notice of Reasons for Refusal" Office Action issued in JP 2021-531328; mailed by the Japanese Patent Office on Oct. 26, 2021.
"Notice of Reasons for Refusal" Office Action issued in JP 2021-531328; mailed by the Japanese Patent Office on Jan. 25, 2022.
"Notice of Reasons for Refusal" Office Action issued in JP 2021-531328; mailed by the Japanese Patent Office on May 24, 2022.

* cited by examiner

--PRIOR ART--

--PRIOR ART--

OPTICAL WAVEGUIDE ELEMENT AND OPTICAL AXIS ADJUSTMENT METHOD

TECHNICAL FIELD

The present disclosure relates to an optical waveguide element and an optical axis adjustment method.

BACKGROUND ART

As a method of introducing light from the outside into an optical waveguide element used for optical fiber communication or the like, there is a method of obtaining optical coupling through a lens. In such a system, the angle of the incident light is adjusted so that the focal point where the beam diameter of the incident light becomes minimum is positioned at the incident end face of the waveguide of the optical waveguide element and the optical axis after incidence becomes parallel to the waveguide. However, since the focal point of the incident light cannot be directly observed, it is necessary to position one or both of the lens and a light source so as to be located at an optimum position while receiving the light emitted from the emission end surface of the waveguide by a power meter or the like and measuring the output of the emission light.

Even when the incident light is not optically coupled to the waveguide and enters the inside of the optical waveguide element from a clad, since the outer periphery of the clad is covered with air or a bonding material or the like and the incident light is totally reflected at the boundary between the clad and the outer periphery. Therefore, even if the light has propagated through the inside of the clad, the light is output from the emission end surface of the clad which forms the same plane as the emission end surface of the wave guide.

In a case where the focal point at which the beam diameter becomes minimum is adjusted to the incident end surface of the waveguide and the optical axis angle of the incident light can be made to coincide with the propagation axis of the waveguide, the incident light propagates through the inside of the waveguide and is emitted from the emission end surface of the waveguide. Even the emission light emitted from the emission end surface of the clad is propagated with substantially the same output as the emission light emitted from the emission end surface of the waveguide. Therefore, even when the output light emitted from the emission end surface is measured by the power meter and the output is increased by adjusting the positions of the lens and the light source, the incident light is not necessarily optically coupled to the waveguide, whereby in the above-described optical axis adjustment method, it is difficult to optically couple the incident light to the waveguide with high efficiency.

In order to solve the problem of the above-described optical axis adjustment method, for example, according to an optical waveguide element and an optical axis adjustment method disclosed in Patent Document 1, the optical waveguide element is provided with a waveguide, a slab waveguide disposed in the X-axis direction with respect to the waveguide, and a minute structure for converting an optical path along the Y-axis direction inside the slab waveguide, that is, a pit row in a concave shape. The reflective light from the pit row in the concave shape is observed by a camera installed above in the Y-axis direction, and the lens is adjusted in the Y-axis direction so as to increase the light intensity, thereby optically coupling the incident light to the slab waveguide. Next, the optical coupling of the incident light to the waveguide is obtained by adjusting the lens in the X-axis direction and the Z-axis direction so that the reflected light from the pit row in the concave shape approaches the waveguide, and finally adjusting so that the light observed by the camera disappears.

In the waveguide type optical device operation characteristic evaluation method described in Patent Document 2, as means for changing an optical path upward with respect to a waveguide in a waveguide type optical device, a method is applied in which a thin layer containing a phosphor or a scatterer having a refractive index higher than that of the waveguide is disposed on an upper surface of the waveguide.

Patent Document 3 discloses a method for adjusting an optical axis of an optical component by monitoring light from an emission end surface of a waveguide, wherein the optical component is slightly moved from a reference position to two or more positions in each of the X-axis direction and the Y-axis direction on the X-Y plane perpendicular to the optical axis, optical coupling intensity is measured at five or more positions, a peak position of light intensity in the X-axis direction and the Y-axis direction is obtained based on the measurement data, whereby the optical axis is adjusted to the peak position.

CITATION LIST

Patent Document

Patent Document 1: Japanese Laid-Open Patent Publication No. 2011-059539
Patent Document 2: Japanese Laid-Open Patent Publication No. 05-248991
Patent Document 3: Japanese Laid-Open Patent Publication No. 06-281850

SUMMARY OF THE INVENTION

Problems to be Solved by the Invention

However, for example, in the optical waveguide element and the optical axis adjustment method disclosed in Patent Document 1, since the reflective light observed by the camera disappears when the degree of optical coupling of the incident light to the waveguide becomes higher than a certain level, there is a problem that it is difficult to obtain the optical coupling of the incident light to the waveguide with maximum efficiency.

Light traveling from a material having a low refractive index to a material having a high refractive index is not totally reflected and all of the light propagates into the material having the high refractive index. In the waveguide type optical device disclosed in Patent Document 2, a thin layer containing the phosphor or the scatterer having a refractive index higher than that of the waveguide is disposed. Therefore, even when light can be made incident on the waveguide, part of the light is lost because the light propagates through the thin layer containing the phosphor or the scatterer having a high refractive index. For this reason, there is a problem that the waveguide propagation efficiency is low.

In addition, in the optical axis adjustment method of the optical component disclosed in Patent Document 3, since it is impossible to separate the light incident on the waveguide from the incident end surface and the light incident on the clad from the incident end surface, it is difficult to adjust the optical axis such that the light can be efficiently incident on the wave guide.

The present disclosure has been made to solve the problems described above, and an object of the present disclosure is to provide an optical waveguide element, a light guide plate, and an optical axis adjustment method that enable easily optically coupling incident light to a waveguide with high efficiency in a method of obtaining optical coupling through a lens as a method of introducing light from the outside to the optical waveguide element.

Solution to the Problems

An optical waveguide element according to the present disclosure includes: a waveguide configured to propagate light; a clad including an upper clad whose lower surface is in contact with one surface of the waveguide and a lower clad whose upper surface is in contact with the other surface of the waveguide; both side surfaces provided on both sides of the upper clad and the lower clad; an incident end surface provided at one end of the waveguide and the clad; and an emission end surface provided at the other end of the waveguide and the clad, wherein one of a flat upper surface of the upper clad and a flat lower surface of the lower clad is formed in a uniform inclined surface with respect to the waveguide, and the other is formed in a uniform parallel surface with respect to the waveguide, wherein a thickness of the clad in a direction perpendicular to the waveguide is thinner on a side of the emission end surface than on a side of the incident end surface, and a distance between the flat upper surface of the upper clad and the flat lower surface of the lower clad uniformly and gradually decreases from the incident end surface to the emission end surface.

An optical axis adjustment method according to the present disclosure includes: a step of condensing light from a light source by a lens on the incident end surface of the optical waveguide element described above; a step of measuring an output emitted from the emission end surface of the optical waveguide element by a power meter; and a step of adjusting a position of a focal point and an incident beam angle of the condensed incident light so as to increase the output by adjusting a position and an angle of one or both of the light source and the lens.

Effect of the Invention

In the optical waveguide element according to the present disclosure, it becomes possible to obtain the optical waveguide element capable of easily optically coupling incident light to the waveguide with high efficiency.

In the light guide plate according to the present disclosure, it becomes possible to obtain the light guide plate used by being attached to the optical waveguide element in order to easily optically couple incident light to the waveguide of the optical waveguide element with high efficiency.

In the optical axis adjustment method according to the present disclosure, a component in which incident light is not optically coupled to a waveguide is scattered from the rough surface of the upper clad to the outside of the optical waveguide element, and while the intensity and position of the scattered light are observed by the imaging device, the position of either or both of the light source and the lens can be adjusted on the basis of the intensity of the scattered light and the scattered light region measured by the imaging device and the output measured by the power meter, thus providing an effect that the optical axis can be adjusted such that the incident light is easily optically coupled with the waveguide with high efficiency.

DESCRIPTION OF EMBODIMENTS

Embodiment 1

Figure 1A:
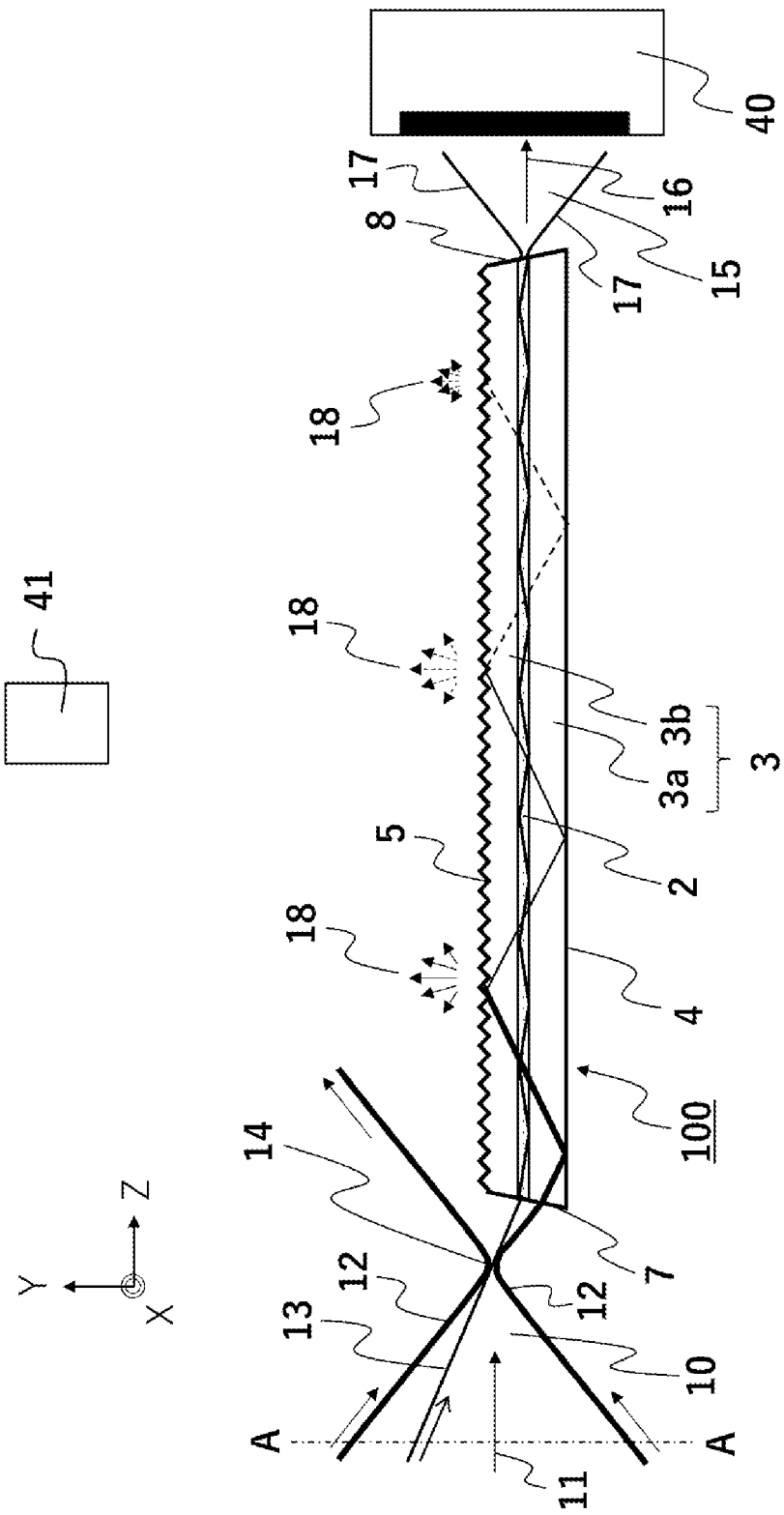
FIG. 1A is a cross-sectional view showing a state before adjustment of an optical axis in the optical waveguide element and the optical axis adjustment method according to Embodiment 1.
Figure 1B:
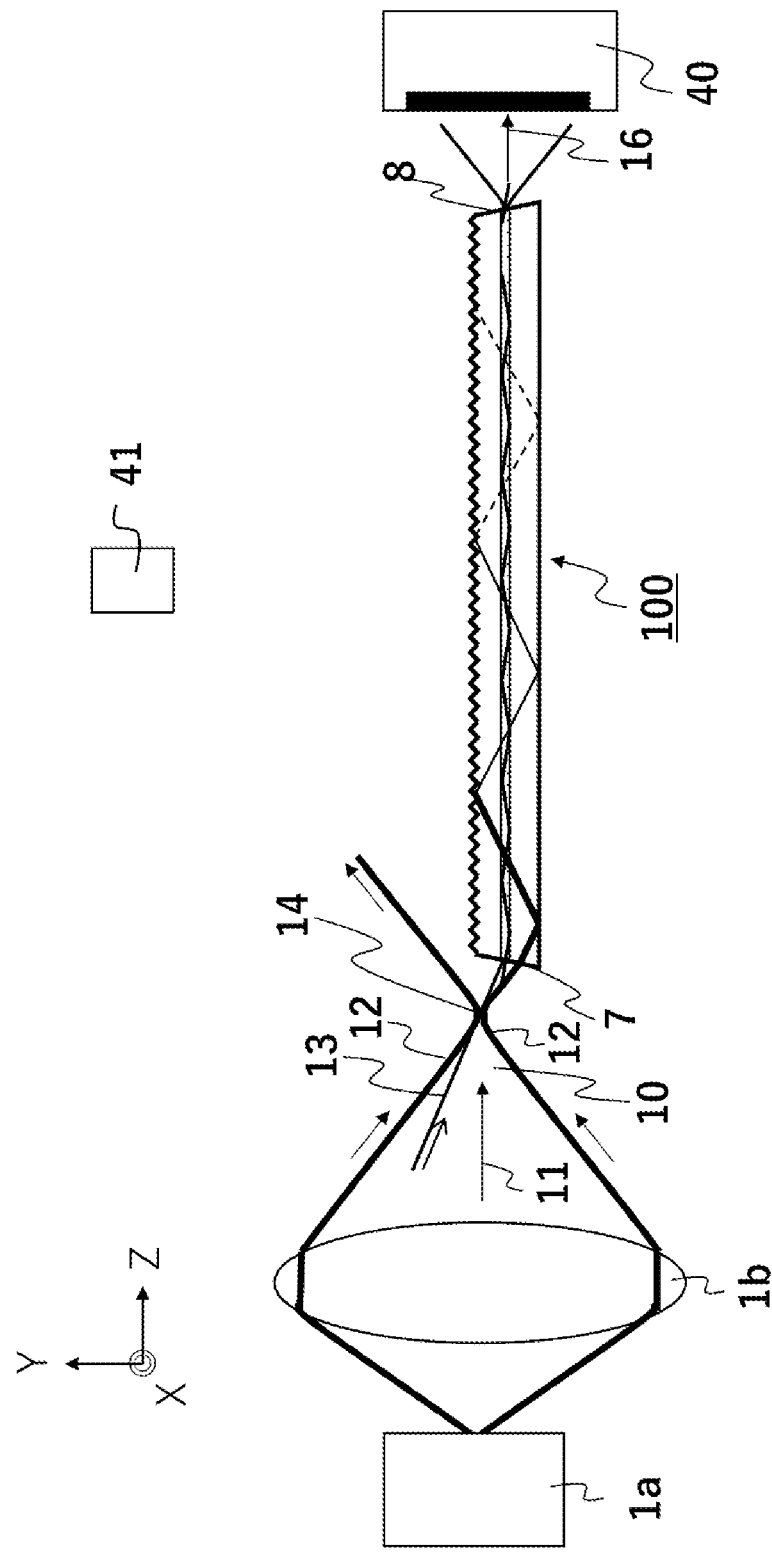
FIG. 1B is a cross-sectional view showing a state before adjustment of the optical axis including a light source and lenses in FIG. 1A.

FIG. 1A is a cross-sectional view showing a state before an optical axis is adjusted in an optical waveguide element 100 in an optical axis adjustment method according to Embodiment 1, and FIG. 1B is a cross-sectional view showing a state before the optical axis is adjusted when a light source and a lens are further included in the configuration shown in FIG. 1A.

As shown in FIG. 1A, the optical waveguide element 100 according to Embodiment 1 is composed of a waveguide 2, a lower clad 3a provided so as to be in contact with one surface of the waveguide 2, and an upper clad 3b provided so as to be in contact with the other surface of the waveguide 2. Noted that the lower clad 3a and the upper clad 3b are collectively referred to as a clad 3.

As shown in FIG. 1A, a direction along the waveguide 2 is defined as a Z direction, a direction parallel to the waveguide 2 in a plane perpendicular to the Z direction is defined as an X direction, and a direction perpendicular to the X direction, that is, a stacking direction is defined as a Y direction. In addition, in the Y direction, the upper clad 3b is defined as the clad 3 positioned on the upper side, and the lower clad 3a is defined as the clad 3 positioned on the lower side, thereby defining the vertical direction.

Noted that in the following description, "parallel" refers not only to a case that is completely parallel but also to a case that is substantially parallel, and "identical" refers not only to a case that is completely identical but also to a case that is substantially identical.

The optical waveguide element 100 has an incident end surface 7 provided at one end of the optical waveguide element 100 and parallel to the X-Y plane, and an emission end surface 8 provided at the other end of the optical waveguide element 100 and parallel to the X-Y plane. That is, the incident end surface 7 and the emission end surface 8 are opposed to each other in a positional relationship. The incident end surface 7 is composed of one end surfaces of the waveguide 2 and the clad 3, and the emission end surface 8 is composed of the other end surfaces of the waveguide 2 and the clad 3.

The lower clad 3a has a reflective surface 4 parallel to the X-Z plane, and the upper clad 3b has a rough surface 5. The reflective surface 4 and the rough surface 5 are opposed to each other through the waveguide 2. That is, the lower surface of the upper clad 3b is in contact with one surface of the waveguide 2, and the rough surface 5 is formed on the upper surface of the upper clad 3b. The upper surface of the lower clad 3a is in contact with the other surface of the waveguide 2, and the reflective surface 4 is formed on the lower surface of the lower clad 3a.

As shown in FIG. 1B, incident light 10 is light generated from a light source 1a and transmitted through a lens 1b. The incident light 10 propagates while reducing the beam diameter in a direction parallel to the Z-axis, and has a focal point 14 where the beam diameter becomes minimum. The incident light 10 having passed through the focal point 14 increases in the beam diameter while propagating. By adjusting the focal point 14 to coincide with a side of the waveguide 2 on the incident end surface 7, high optical coupling to the waveguide 2 can be obtained.

Figure 2:
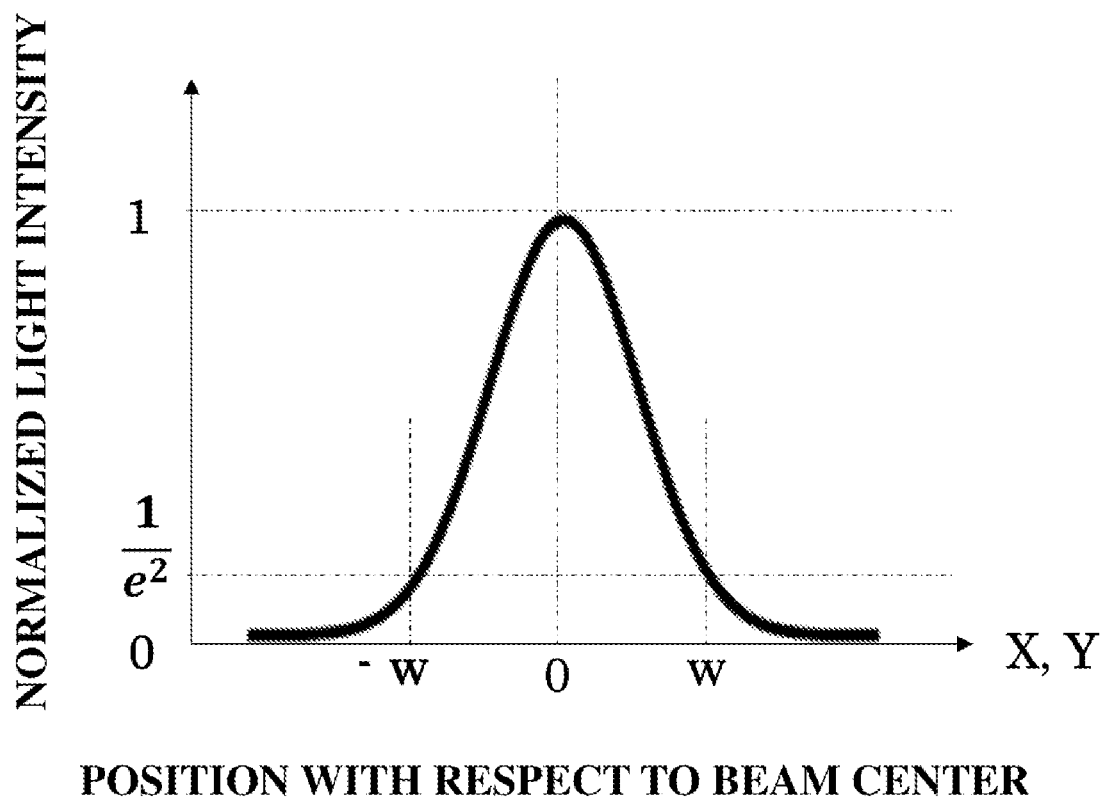
FIG. 2 is a diagram showing a light intensity distribution of incident light in a cross section taken along line A-A in FIG. 1A in the optical waveguide element according to Embodiment 1.

FIG. 2 schematically shows the light intensity distribution of the incident light 10 in the A-A cross section in FIG. 1A. The light intensity is maximized at the center position of the beam. Here, when the maximum light intensity is normalized as 1 and the positions where the light intensity is $1/e^2$ of the maximum light intensity are denoted by w and −w, 2w which is the diameters of the circles denoted by w and −w is referred to as a beam diameter. An optical axis 12 of the beam diameter of the incident light and an optical axis 17 of the beam diameter of the emission light are shown in FIG. 1A.

Although most of the components of the incident light 10 reaching the incident end surface 7 are incident on the inside of the optical waveguide element 100, a part of the incident light 10 is reflected by the incident end surface 7 and becomes return light due to the difference in refractive index between the air layer before incidence and the optical waveguide element 100. Incidentally, even if an anti-reflective film is provided on the incident end surface 7 in order to suppress the reflection of the incident light 10, the reflective light cannot be made completely 0.

Figure 1C:
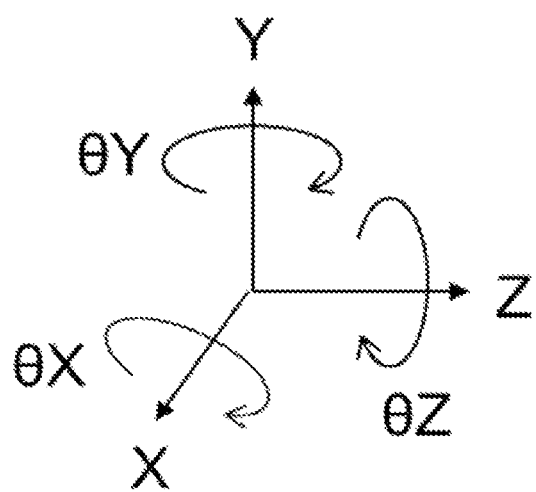
FIG. 1C is a diagram for explaining coordinates.

In a case where the reflective light, that is, the return light, adversely affects the characteristics of the optical waveguide element 100, the incident end surface 7 of the optical waveguide element 100 may be inclined in the θX direction as in the configuration of FIG. 1A such that the return light is not parallel to a principal axis 11 of the incident light but has a certain angle. Alternatively, the incident end surface 7 may be inclined in the θY direction. Note that the relationship between the X, Y, and Z directions and the θX, θY, and θZ directions is shown in FIG. 1C.

Similarly, the light propagated through the inside of the waveguide 2 is output from the emission end surface 8 as the emission light 15, however a part of the emission light 15 is reflected by the emission end surface 8 and becomes the return light. Therefore, similarly to the incident end surface 7, the emission end surface 8 may also be inclined in the θX direction or the θY direction.

The light incident on the optical waveguide element 100 from the incident end surface 7 propagates through the optical waveguide element 100 and is output from the emission end surface 8. The output of the emission light 15, that is, the light intensity thereof is measured by a power meter 40. The power meter 40 is disposed such that the light receiving surface of the power meter 40 is perpendicular to the principal axis 16 of the emission light.

The incident light 10 transmitted through the lens 1b propagates in a direction parallel to the Z-axis while reducing the beam diameter, and has the focal point 14 where the beam diameter becomes minimum. The incident light 10 having passed through the focal point 14 increases in the beam diameter while propagating. By adjusting the focal point 14 to coincide with the side of the waveguide 2 on the incident end surface 7, high optical coupling to the waveguide 2 can be obtained. However, in general, since the focal point 14 and the incident end surface 7 do not coincide with each other before the adjustment of the optical axis, only a part of the incident light 13 is optically coupled to the waveguide 2. A part of the component of the incident light 10 that is not optically coupled to the waveguide 2 is incident on the inside of the optical waveguide element 100 from a side of the clad 3 on the incident end surface 7, and the remaining part thereof propagates to the outside of the optical waveguide element 100.

That is, by adjusting the X-axis, the Y-axis, the Z-axis, the θX-axis, and the θY-axis of one or both of the light source 1a and the lens 1b such that the output of the emission light 15 measured by the power meter 40 becomes as large as possible, the optical coupling to the waveguide 2 is obtained with high efficiency. However, in this state, the optical coupling is not sufficiently high.

In the optical waveguide element 100 according to Embodiment 1, the rough surface 5 is formed on the upper surface of the upper clad 3b. When the light propagating through the clad 3 is incident on the rough surface 5 of the upper clad 3*b*, a part of the light is scattered to the outside of the optical waveguide element 100 as scattered light 18. The scattered light 18 is observed by using the imaging device 41 disposed above the optical waveguide element 100 in the Y direction. The X-axis, Y-axis, Z-axis, θX-axis and θY-axis of one or both of the light sources 1*a* and the lenses 1*b* are adjusted so that the light intensity of the observed scattered light 18 is as small as possible and the region where the scattered light is emitted, that is, the scattered light region is as small as possible, whereby optical coupling to the waveguides 2 is obtained more efficiently.

The operation of the optical waveguide element 100 according to Embodiment 1 will be described in more detail below.

Light incident on the inside of the optical waveguide element 100 from the side of the clad 3 on the incident end surface 7 propagates while being reflected in a zigzag manner inside the clad 3 between the reflective surface 4 of the lower clad 3*a* and the rough surface 5 of the upper clad 3*b*. Since the rough surface 5 is rough, all the light is not totally reflected between the upper clad 3*b* and the external air layer, and a part of the light becomes the scattered light 18 and leaks from the upper clad 3*b* to the outside, that is, to the outside of the optical waveguide element 100. Most components of the light propagating through the clad 3 of the optical waveguide element 100 become the scattered light 18 and are not emitted from the emission end surface 8 by being scattered multiple times by the rough surface 5 while being reflected in a zigzag manner between the reflective surface 4 of the lower clad 3*a* and the rough surface 5 of the upper clad 3*b* inside the optical waveguide element 100.

Since the light incident into the optical waveguide element 100 from the side of the waveguide 2 on the incident end surface 7 propagates through the waveguide 2 due to the refractive index difference between the waveguide 2 and the clad 3, the light is not scattered by the rough surface 5 and is output as the emission light 15 from a side of the waveguide 2 on the emission end surface 8. By receiving the output of the emission light 15 by the power meter 40, the output of the component optically coupled to the waveguide 2 in the incident light 10 can be measured.

The imaging device 41 may be disposed above the optical waveguide element 100 in the Y direction. By imaging the rough surface 5 by the imaging device 41, it becomes possible to confirm the generating location of the scattered light 18.

An adjustment method for obtaining optical coupling to the waveguide 2 using the power meter 40 will be described.

In a case where the deviation of the incident light 10 is large and the light is not incident on the inside of the optical waveguide element 100 from the incident end surface 7, the scattered light 18 is not observed by the imaging device 41 and the output of the emission light 15 cannot be measured by the power meter 40.

However, since the area of the incident end surface 7 in the combination of the waveguide 2 and the clad 3 is sufficiently larger than the area of the side of the waveguide 2 on the incident end surface 7, it is relatively easy to adjust one or both of the light source 1*a* and the lens 1*b* so that a part of the incident light 10 is incident on the inside of the optical waveguide element 100 from the incident end surface 7 as shown in FIG. 1A. In this case, since the focal point 14 does not coincide with the incident end surface 7, the beam diameter at the incident end surface 7 is large, and thus only a part 13 of the incident light is optically coupled to the waveguide 2. The light incident on the waveguide 2 propagates through the inside of the waveguide 2 and can be measured by the power meter 40 as the output of the emission light 15 from the emission end surface 8.

Figure 3:
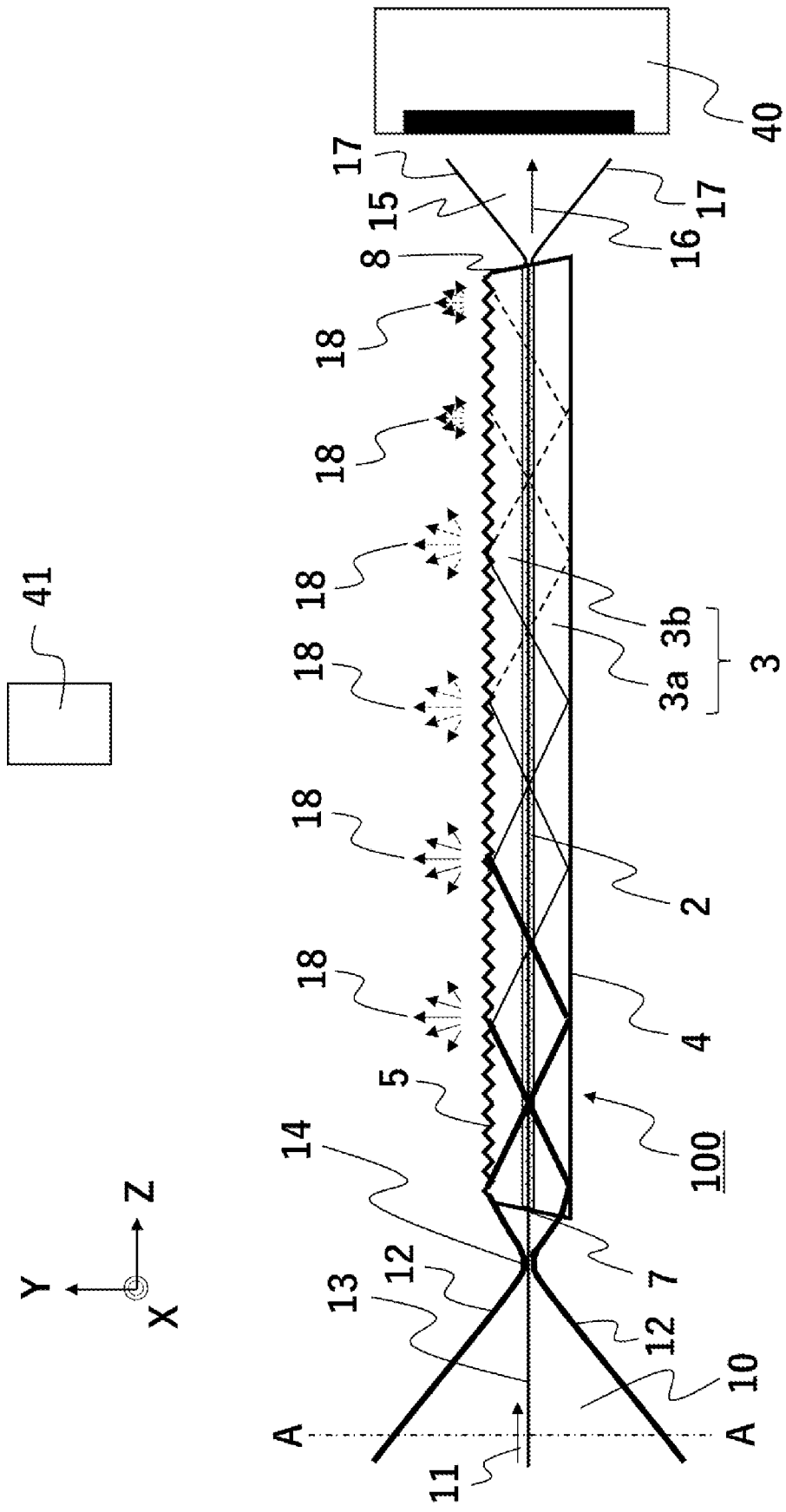
FIG. 3 is a cross-sectional view showing a state in which an optical axis of incident light is being adjusted in the optical waveguide element according to Embodiment 1.

Next, one or both of the light source 1*a* and the lens 1*b* are adjusted in the Y direction such that the emission light 15 measured by the power meter 40 is maximized. Such state is shown in FIG. 3. A component of the maximum light intensity of the incident light 10 is optically coupled to the waveguide 2, propagates through the inside of the waveguide 2, and is output from the emission end surface 8 as the emission light 15.

Next, similarly, one or both of the light source 1*a* and the lens 1*b* are moved in the X direction so that the emission light 15 measured by the power meter 40 is maximized. Further, the focal point 14 is moved in the Z direction so that the output of the emission light 15 from the emission end surface 8 measured by the power meter 40 is maximum.

In this way, the adjustment of the position of the focal point 14 in the X-axis, the Y-axis, and the Z-axis is repeated multiple times such that the output of the emission light 15 measured by the power meter 40 increases. In a case where the output of the emission light 15 after the adjustment is not sufficient as the output of the emission light 15 assumed from the output of the incident light 10, the θX axis and the θY axis of one or both of the light source 1*a* and the lens 1*b* are moved, and then the position of the focal point 14 in the X-axis, the Y-axis, and the Z-axis is adjusted again such that the output of the emission light 15 measured by the power meter 40 is maximum. Thus, the incident light 10 can be optically coupled to the waveguide 2 with high efficiency.

Figure 4:
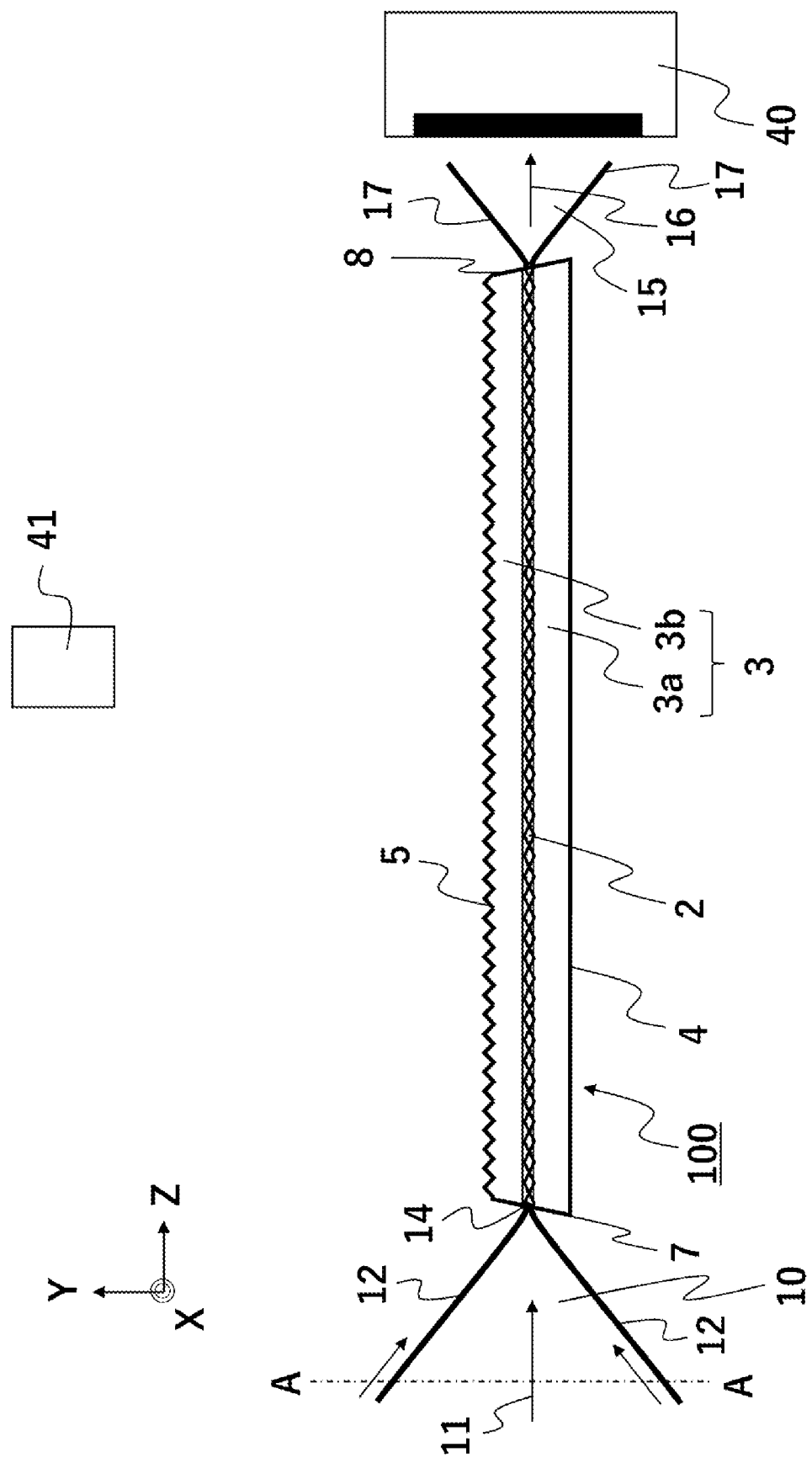
FIG. 4 is a cross-sectional view showing a state at the time of completion of adjustment of an optical axis of incident light in the optical waveguide element according to Embodiment 1.

FIG. 4 is a cross-sectional view showing a state in which the incident light 10 in the optical waveguide element 100 is optically coupled to the waveguide 2 with high efficiency. Most components of the incident light 10 are optically coupled to the waveguide 2 and can be output as the emission light 15 from the emission end surface 8 after propagating through the inside of the waveguide 2.

Figure 5:
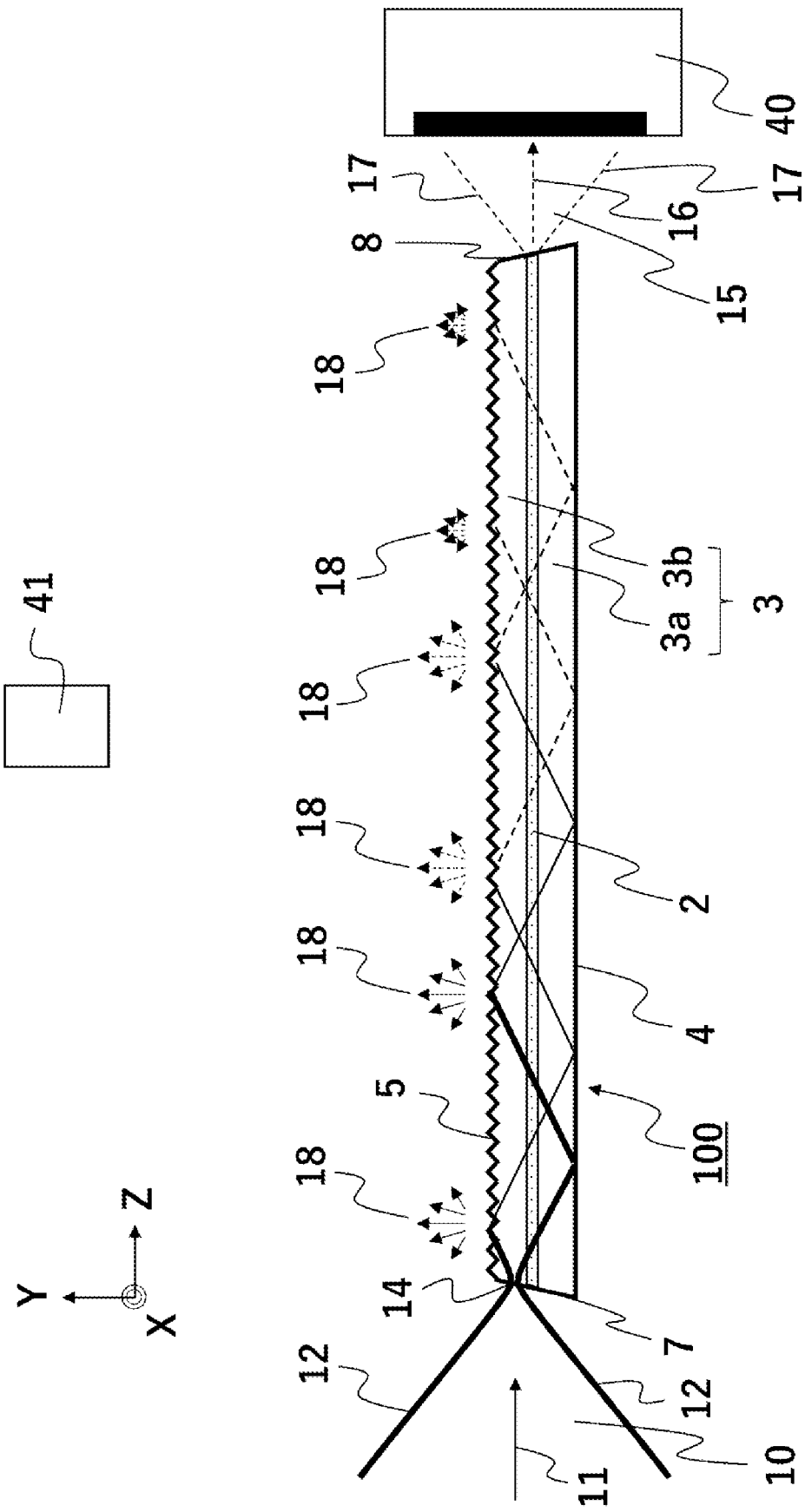
FIG. 5 is a cross-sectional view showing a state in which an optical axis of incident light is being adjusted in the optical waveguide element according to Embodiment 1.

FIG. 5 is a cross-sectional view showing a state where the focal point 14 and the incident end surface 7 are located at the same position in the Z direction but are deviated from each other in the Y direction in the optical waveguide element 100. Since the beam diameter of the focal point 14 almost coincides with the mode field diameter of the waveguide 2, almost all the light is not optically coupled to the waveguide 2 by shifting the position of the beam diameter of the focal point 14 in the Y direction by about twice the thickness of the waveguide 2 from the state shown in FIG. 4 in which the optical coupling of the incident light 10 is maximized.

In a case where the positions of the focal point 14 and the incident end surface 7 are deviated from each other in the Z direction, the beam diameter at the position of the incident end surface 7 is larger than the beam diameter at the focal point 14. Therefore, even if the position is shifted by about twice the thickness of the waveguide 2, a part of the incident light 10 is optically coupled to the waveguide 2 and is output as the emission light 15 to be measured by the power meter 40. Therefore, since it can be determined that the position of the focal point 14 in the Z direction is deviated, the position of the focal point 14 on the X-axis, the Y-axis, and the Z-axis is moved again in order to adjust the output of the emission light 15 measured by the power meter 40 so as to be maximized, thereby making it possible to adjust the optical coupling state with the maximum efficiency as shown in FIG. 4.

An adjustment method for obtaining optical coupling to the waveguide 2 using the imaging device 41 will be described below.

From a state in which the deviation of the incident light 10 is large, one or both of the light source 1a and the lens 1b are adjusted so that a part of the incident light 10 is incident on the inside of the optical waveguide element 100 from the incident end surface 7 as shown in FIG. 1A. At this time, since the focal point 14 does not coincide with the incident end surface 7, the beam diameter at the incident end surface 7 is large. Therefore, the incident light 10 is incident on the inside of the optical waveguide element 100 from the side of the clad 3 on the incident end surface 7, whereby scattered light 18 is generated on the rough surface 5 of the upper clad 3b.

Next, one or both of the light source 1a and the lens 1b are adjusted in the Y direction so as to increase the light intensity and the scattered light region of the scattered light 18 observed by the imaging device 41. This state is shown in FIG. 3. Since most of the light incident on the inside of the optical waveguide element 100 is scattered to the outside of the optical waveguide element 100 as the scattered light 18, the light intensity and the scattered light region of the scattered light 18 become the largest.

As the proportion of the output of the incident light 10 optically coupled to the waveguide 2 increases, the light intensity and the scattered light region of the scattered light 18 decrease. Therefore, one or both of the light source 1a and the lens 1b are adjusted in the X direction so that the light intensity and the scattered light region of the scattered light 18 observed by the imaging device 41 are reduced.

Further, the focal point 14 is moved in the Z direction such that the light intensity and the scattered light region of the scattered light 18 observed by the imaging device 41 are minimized. In this way, the adjustment of the position of the focal point 14 in the X-axis, the Y-axis, and the Z-axis is repeated multiple times such that the light intensity and the scattered light region of the scattered light 18 observed by the imaging device 41 are minimized.

Even if the positions of the X-axis, the Y-axis, and the Z-axis of one or both of the light source 1a and the lens 1b are repeatedly adjusted such that the output of the power meter 40 is maximized, the output measured by the power meter 40 may be weaker than the incident light 10, and the scattered light 18 may be observed by the imaging device 41. In such a case, since the principal axis 11 of the incident light is inclined with respect to the incident end surface 7 and the principal axis 11 of the incident light incident on the inside of the waveguide 2 has an angle with respect to the Z direction, a component of the light having a large angle leaks from the waveguide 2 to the clad 3.

When the deviation angle of the principal axis 11 of the incident light is in the θY direction, the light intensity and the area of the scattered light region of the scattered light 18 measured by the imaging device 41 are biased on both sides of the waveguide 2 in the X-Z plane. By adjusting the direction in which the bias of the scattered light 18 is eliminated, that is, by adjusting the angle of the principal axis 11 of the incident light in the θY direction, the output of the emission light 15 increases while the scattered light 18 decreases.

When the deviation angle of the principal axis 11 of the incident light is in the θX direction, the scattered light 18 measured by the imaging device 41 is observed at a position away from the incident end surface 7 in the Z direction or at a position close to the incident end surface 7. By adjusting the angle of the principal axis 11 of the incident light in the θX direction, the output of the emission light 15 increases and the scattered light 18 decreases.

Since the angle of the principal axis 11 of the incident light can be adjusted by observing the location where the scattered light 18 is generated, that is, the light scattering region by the imaging device 41, the incident light 10 can be optically coupled to the waveguide 2 with higher efficiency.

In each figure illustrating the optical waveguide element 100 according to Embodiment 1, the incident end surface 7 and the emission end surface 8 is inclined in the θY direction such that the return light has an angle with respect to the principal axis 11 of the incident light. Generally, in a case where the refraction index of the waveguide 2 is about 1.5, the optical coupling of the return light with respect to the incident light 10 can be suppressed by 30 dB or more by setting the inclination angle of the incident end surface 7 and the emission end surface 8 to about 8°.

Figure 6:
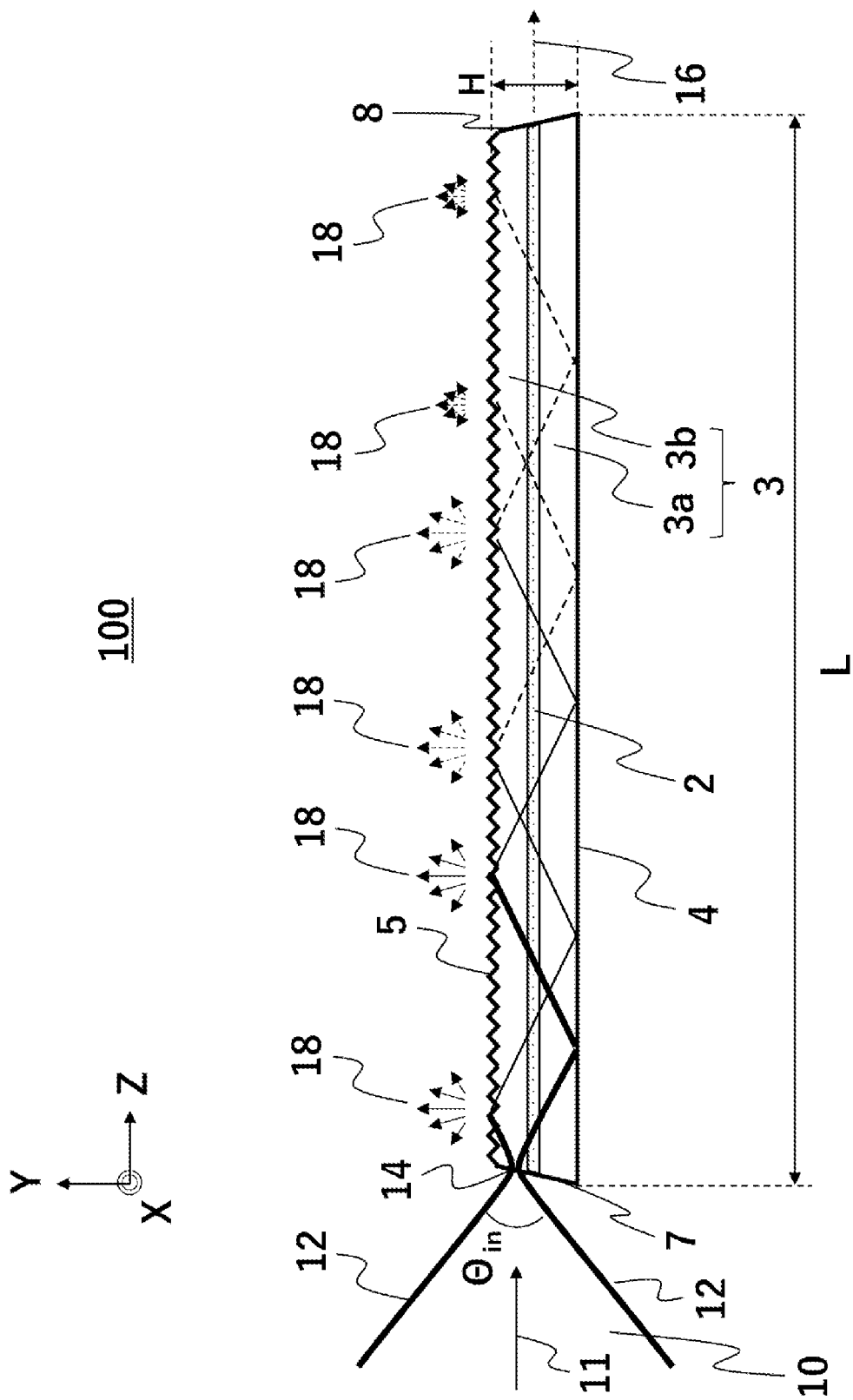
FIG. 6 is a cross-sectional view showing a shape of the optical waveguide element in the optical waveguide element according to Embodiment 1.

FIG. 6 is a cross sectional view showing a state in which the focal point 14 is not optically coupled to the waveguide 2 and the light propagating through the inside of the clad 3 is incident on the rough surface 5 at least once to generate the scattered light 18 in the optical waveguide element 100.

Where the height (thickness) of the optical waveguide element 100 in the Y direction is denoted by H, the refractive index of the clad 3 is denoted by n, and the incident beam angle of the incident light 10 is denoted by $\theta_{in}$, then, the length L of the optical waveguide element 100 is set so as to satisfy the following Equation (1).

[Equation 1]

$$L > \frac{2H}{\tan\left(\sin^{-1}\left(\frac{1}{n} \sin \frac{1}{2} \theta_{in}\right)\right)} \quad (1)$$

By setting the length L of the optical waveguide element 100 in this way, since the light propagating through the inside of the clad 3 is incident on the rough surface 5 at least once, the output of the emission light 15 increases as the light optically coupled to the waveguide 2 increases. Therefore, the optical coupling can be maximized by adjusting the position of the focal point 14 in the X-axis, the Y-axis, and the Z-axis such that the output of the emission light 15 is maximized.

Noted that the clad 3 may be bonded to a substrate (not shown). Since the refractive index of the substrate is generally higher than that of air, the angle of total reflection inside the clad 3 is large with respect to the normal to the reflective surface 4, so that a part 13 of the incident light with a small angle is not totally reflected and propagates through the inside of the substrate. In a case where the refractive index of the substrate is higher than that of the clad 3, the propagated light is not totally reflected between the clad 3 and the substrate.

Even when the refractive index of the substrate is higher than that of the clad 3, reflection occurs between the substrate and layers outside the substrate, so that the same effect as that of the optical waveguide element 100 shown in FIG. 1 occurs. When there is a propagation loss at the junction portion between the clad 3 and the substrate, or when there is a propagation loss between the substrate and external layers, the light incident on the side of the clad 3 on the incident end surface 7 is further attenuated, whereby the light can be more easily separated from the emission light 15.

As described above, in the optical waveguide element 100 and the optical axis adjustment method according to Embodiment 1, the components of the incident light 10 not optically coupled to the waveguide 2 are scattered from the rough surface 5 of the upper clad 3b to the outside of the optical waveguide element 100, and while the light intensity and the position of the scattered light 18 are observed by the imaging device 41, the position of one or both of the light source 1a and the lens 1b can be adjusted such that the output of the emission light 15 optically coupled to the waveguide 2 and measured by the power meter 40 is maximum, thus providing an effect that the incident light 10 can be easily optically coupled to the waveguide 2 with high efficiency.

COMPARATIVE EXAMPLE

A comparative example will be described below.

Figure 15:
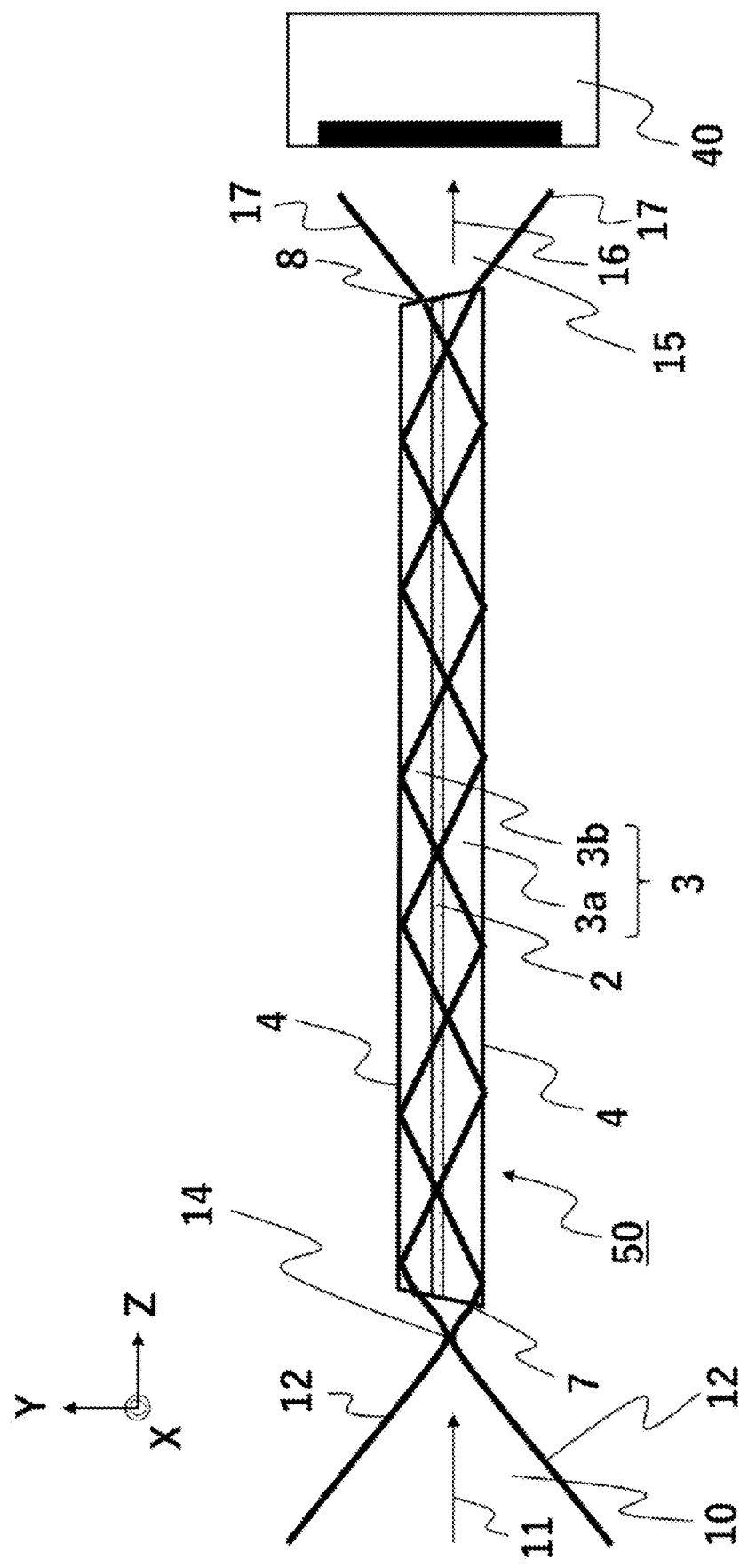
FIG. 15 is a cross-sectional view showing a state in which an optical axis of incident light is being adjusted in an optical waveguide element according to a comparative example.

FIG. 15 is a cross-sectional view showing a state of propagation of the incident light 10 in a case where the incident light 10 is not optically coupled to the waveguide 2 and is incident on the inside of the optical waveguide element 50 from the clad 3 in the optical waveguide element 50 as the comparative example. Since the outer periphery of the clad 3 is covered with air or a bonding member and the boundary surface functions as a reflective surface 4, the incident light 10 is totally reflected at the boundary with the clad 3. For this reason, even the light propagated through the inside of the clad 3 is outputted as the emission light 15 from the side of the clad 3 on the emission end surface 8.

Figure 16:
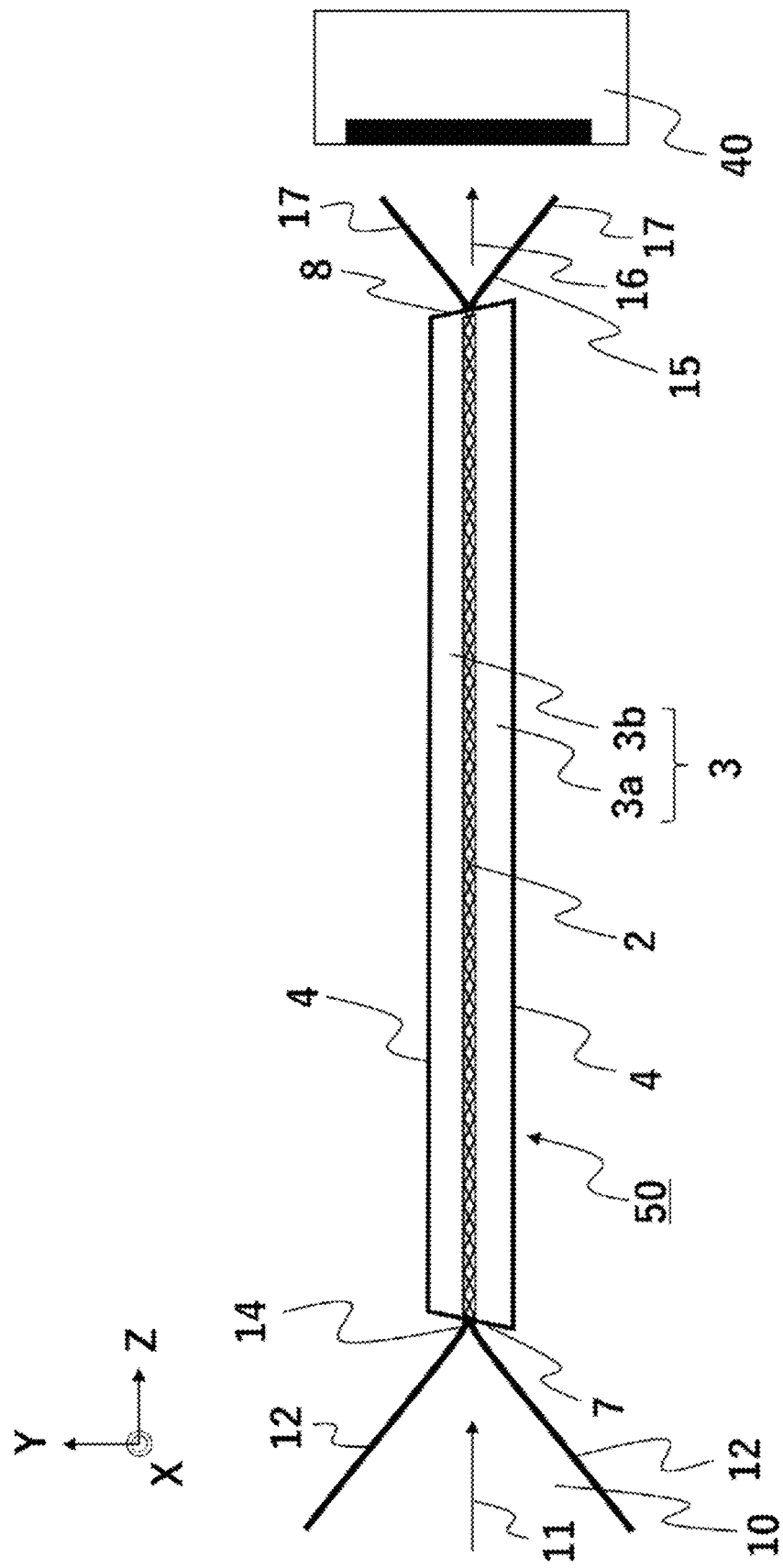
FIG. 16 is a cross-sectional view showing a state upon completion of adjustment of an optical axis of incident light in the optical waveguide element according to the comparative example.

When the focal point 14 where the beam diameter of the incident light 10 is minimized is adjusted to the side of the waveguide 2 on the incident end surface 7 so that the angle of the principal axis 11 of the incident light coincides with the propagation axis of the waveguide 2, the incident light 10 propagates through the inside of the waveguide 2 and is output from the side of the waveguide 2 on the emission end surface 8 in the cross-sectional view of FIG. 16 showing the state at the completion of the adjustment of the optical axis of the incident light.

However, since the emission light 15 outputted from the side of the clad 3 on the emission end surface 8 as shown in FIG. 15 propagates with almost the same output as the emission light 15 outputted from the side of the waveguide 2 on the emission end surface 8 as shown in FIG. 16, even if the output of the emission light 15 from the emission end surface 8 is measured by a power meter 40 and the output of the emission light 15 is increased by adjusting the position of the lens and the light source (neither of which is shown), the incident light 10 is not necessarily optically coupled to the waveguide 2. That is, in the optical waveguide element 50 according to the comparative example and the optical axis adjustment method using the optical waveguide element 50, it is difficult to optically couple the incident light 10 to the waveguide 2 with high efficiency.

Embodiment 2

Figure 7:
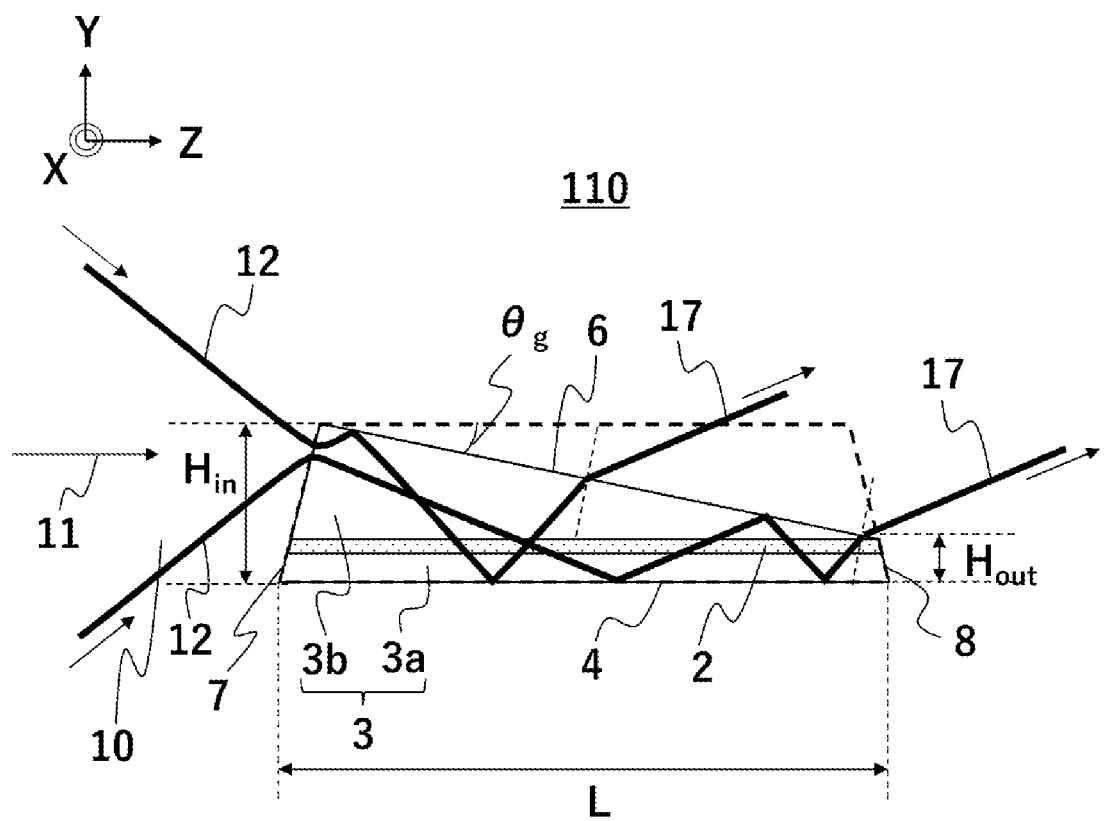
FIG. 7 is a cross-sectional view showing a state in which the optical axis of incident light is being adjusted in the optical waveguide element according to Embodiment 2.

FIG. 7 is a cross-sectional view showing a state in which an incident light 10 is not optically coupled to a waveguide 2 in an optical waveguide element 110 and an optical axis adjustment method according to Embodiment 2.

In FIG. 7, the optical waveguide element 110 is composed of the waveguide 2, a clad 3 including a lower clad 3a in contact with a lower surface of the waveguide 2 and an upper clad 3b in contact with a upper surface of the waveguide 2, an incident end surface 7 provided at one end of the optical waveguide element 110 and parallel to the X-Y plane, an emission end surface 8 provided at the other end of the optical waveguide element 110 and parallel to the X-Y plane, a reflective surface 4 provided on the lower clad 3a and parallel to the X-Z plane, and an inclined surface 6 provided on the upper clad 3b and opposed to the reflective surface 4.

The inclined surface 6 of the upper clad 3b is inclined at an inclination angle $\theta_g$ with respect to a plane parallel to the reflective surface 4 of the lower clad 3a. That is, the inclined surface 6 of the upper clad 3b is inclined at the inclination angle $\theta_g$ with respect to the waveguide 2.

The inclination angle $\theta_g$ is an angle inclined in a direction in which the area of the emission end surface 8 becomes smaller than the area of the incident end surface 7. That is, a height (thickness) $H_i$ of the incident end surface 7 is larger than a height (thickness) $H_{out}$ of the emission end surface 8. This can also be said that the thickness of the clad 3 in the direction perpendicular to the waveguide 2, that is, in the Y direction, is thinner on the emission end surface 8 side than on the incident end surface 7 side. The emission light 15 and the power meter 40 are the same as those in Embodiment 1, and thus are omitted in FIG. 7.

Since the optical axis 12 of the beam diameter of the incident light 10 whose light intensity is $1/e^2$ of the maximum light intensity has an angle with respect to the principal axis 11 of the incident light, the light incident from a side of the clad 3 on the incident end surface 7 and propagating through the inside of the optical waveguide element 110 is reflected by the reflective surface 4 of the lower clad 3a and the inclined surface 6 of the upper clad 3b.

Here, since the inclined surface 6 of the upper clad 3b is inclined at the inclination angle $\theta_g$ in the θY direction with respect to the X-Z plane, the angle of the light incident on the inclined surface 6 is smaller than the normal line of the inclined surface 6 by the inclination angle $\theta_g$. Therefore, since the light incident on the inclined surface 6 cannot satisfy the total reflection condition, the light is output from the inclined surface 6 to the outside of the optical waveguide element 110 as indicated by the optical axis 17 of the beam diameter of the emission light in FIG. 7.

In a case where the inclination angle $\theta_g$ is small, since the light propagating through the inside of the optical waveguide element 110 initially satisfies the total reflection condition, the light is totally reflected by the inclined surface 6 and the reflective surface 4 and propagates in a zigzag manner therebetween. The angle of the propagating light with respect to the normal line of the inclined surface 6 is shallow, that is, small, each time the light is reflected by the inclined surface 6.

In a case where the number of times that the light propagating through the inside of the optical waveguide element 110 is reflected by the inclined surface 6 is N, the principal axis of the propagating light becomes small as the angle $\theta_g$ times N and the propagating light is incident on the inclined surface 6. For this reason, the light propagating through the inside of the optical waveguide element 110 eventually fails to satisfy the total reflection condition in the propagation process, and is output from the inclined surface 6 to the outside of the optical waveguide element 110 as indicated by the optical axis 17 of the beam diameter of the emission light in FIG. 7.

As described above, since a part of the component of the incident light 10 incident from the clad 3 is output from the inclined surface 6 to the outside of the optical waveguide element 110, the emission light 15 output from the emission end surface 8 becomes small. On the other hand, since the light optically coupled to the waveguide 2 at the incident end surface 7 is output from a side of the waveguide 2 on the emission end surface 8, the ratio of the light propagating through the inside of the optical waveguide element 110 optically coupled to the waveguide 2 is increased, whereby the output of the emission light 15 increases. Therefore, the maximum optical coupling can be obtained by adjusting the position of the focal point 14 in the X-axis, the Y-axis, and the Z-axis such that the output measured by the power meter 40 is maximum.

As described above, in the optical waveguide element 110 and the optical axis adjustment method according to Embodiment 2, since the component of the light propagating through the inside of the optical waveguide element 110 that is not optically coupled to the waveguide 2 is output from the inclined surface 6 to the outside of the optical waveguide element 110, only the component optically coupled to the waveguide 2 can be measured by the power meter 40, thus providing an effect that the incident light 10 can be easily optically coupled to the waveguide 2 with high efficiency.

Embodiment 3

Figure 8:
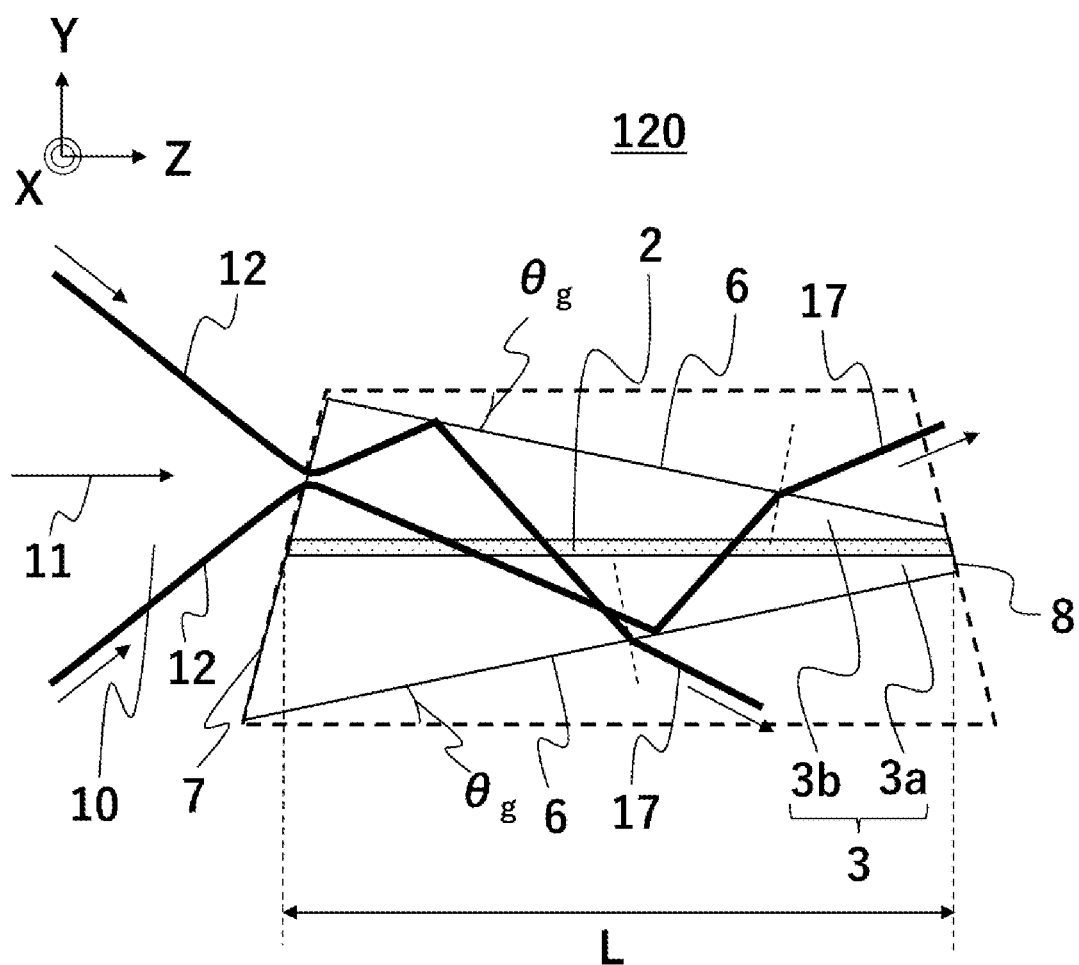
FIG. 8 is a cross-sectional view showing a state in which the optical axis of incident light is being adjusted in the optical waveguide element according to Embodiment 3.

FIG. 8 is a cross-sectional view showing a state in which an incident light 10 is not optically coupled to a waveguide 2 in an optical waveguide element 120 and an optical axis adjustment method according to Embodiment 3.

In FIG. 8, the optical waveguide element 120 is composed of a waveguide 2, a clad 3 including a lower clad 3a in contact with a lower surface of the waveguide 2 and an upper clad 3b in contact with a upper surface of the waveguide 2, an incident end surface 7 provided at one end of the optical waveguide element 120 and parallel to the X-Y plane, an emission end surface 8 provided at the other end of the optical waveguide element 120, and two inclined surfaces 6 provided on the lower clad 3a and the upper clad 3b respectively and opposed to each other with the waveguide 2 interposed therebetween and inclined at an inclination angle $\theta_g$ with respect to the X-Z plane. The inclination angle $\theta_g$ is an angle inclined in a direction in which the area of the emission end surface 8 becomes smaller than the area of the incident end surface 7. The emission light 15 and the power meter 40 are the same as those in Embodiment 1, and thus are omitted in FIG. 8.

Similarly to the optical waveguide element 110 according to Embodiment 2, light incident from a side of the clad 3 on the incident end surface 7 propagates in a zigzag manner between the inclined surfaces 6 opposed to each other. Since the two surfaces of the clad 3 opposed to each other with the waveguide 2 interposed therebetween are inclined, the angle, with respect to the normal line, that decreases each time reflection is repeated on each inclined surface 6 is doubled. Therefore, even when the inclination angle $\theta_g$ is small, the light propagating through the inside of the optical waveguide element 120 cannot satisfy the total reflection condition of the inclined surfaces 6, and thus, as indicated by an optical axis 17 of the beam diameter of the emission light in FIG. 8, the light propagating through the inside of the optical waveguide element 120 is output from the inclined surfaces 6 to the outside of the optical waveguide element 120.

In a case where the inclination angle $\theta_g$ is the same as that of the optical waveguide element 110 according to Embodiment 2, the same effect can be obtained even if the length L of the optical waveguide element 120 is shorter than the length of the optical waveguide element 110 according to Embodiment 2.

Further, even if the angle of light incident on the incident end surface 7 is shallow, the light is output from the inclined surfaces 6. For this reason, the ratio of the light outputted from a side of the clad 3 on the emission end surface 8 to the light incident on the clad 3 is reduced, thus providing an effect that it becomes possible to easily adjust the position of the focal point 14 so as to increase the output measured by the power meter 40.

As described above, in the optical waveguide element 120 and the optical axis adjustment method according to Embodiment 3, in addition to the effects of Embodiment 2, even if the inclination angle $\theta_g$ is small or the length L of the optical waveguide element 120 is short, a component of the incident light 10 that is not optically coupled to the waveguide 2 can be output from the inclined surfaces 6. Therefore, even a component of the incident light 10 having the shallow angle can be output from the inclined surfaces 6 to the outside of the optical waveguide element 120, thus providing an effect that the incident light 10 can be easily optically coupled to the waveguide 2 with high efficiency.

Embodiment 4

Figure 9:
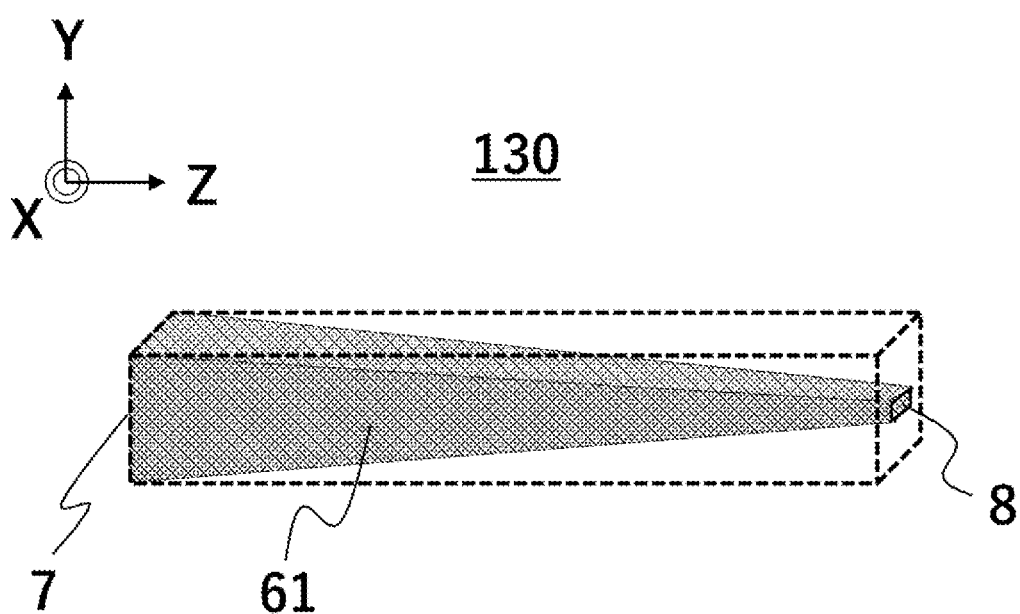
FIG. 9 is a schematic view of an optical waveguide element according to Embodiment 4.

FIG. 9 is a schematic view showing an optical waveguide element 130 in the optical waveguide element 130 and an optical axis adjustment method according to Embodiment 4.

In FIG. 9, the optical waveguide element 130 is composed of a waveguide 2 (not shown), a clad 3 (not shown) including a lower clad 3a in contact with a lower surface of the waveguide 2 and an upper clad 3b in contact with a upper surface of the waveguide 2, an incident end surface 7 parallel to the X-Y plane, and an emission end surface 8 opposed to the incident end surface 7, and four surfaces of the optical waveguide element 130 other than the incident end surface 7 and the emission end surface 8 are constituted by inclined surfaces 61. Each of the inclined surfaces 61 is inclined at an inclination angle $\theta_g$ in a direction in which the area of the emission end surface 8 becomes smaller than the area of the incident end surface 7. The emission light 15 and the power meter 40 are the same as those in Embodiment 1, and thus are omitted in FIG. 9.

Similarly to the optical waveguide element 120 according to Embodiment 3, since the light incident from a side of the clad 3 on the incident end surface 7 propagates in a zigzag manner between the inclined surfaces 61 opposed to each other due to the inclination angle $\theta_g$, the light cannot satisfy the total reflection condition in the process of propagation. As a result, the light is output from the inclined surfaces 61 to the outside of the optical waveguide element 130.

The optical waveguide element 130 according to Embodiment 4 further has the inclined surfaces 61 opposed to each other in both directions of the X-Z plane and the Y-Z plane. That is, the optical waveguide element 130 has a shape in which the width between both side surfaces of the waveguide 2 and the clad 3 becomes narrower from the incident end surface 7 toward the emission end surface 8. With such a configuration, light incident from the side of the clad 3 on the incident end surface 7 is output from the inclined surfaces 61 to the outside of the optical waveguide element 130 in the process of propagation regardless of whether the light is deviated in the X direction or the Y direction. Therefore, since the ratio of the light outputted from the emission end surface 8 to the light incident on the clad 3 is reduced, it becomes easy to adjust the focal point 14 such that the output of the emission light 15 measured by the power meter 40 is maximized.

As described above, the optical waveguide element 130 and the optical axis adjustment method according to Embodiment 4 have the following effects in addition to the effects of Embodiment 3. Regardless of whether the positional deviation of the focal point of the incident light 10 is in the Y direction or the X direction, the component of the incident light 10 that is not optically coupled to the waveguide 2 is output from the inclined surfaces 61 to the outside of the optical waveguide element 130, and thus the component of the light propagating through the inside of the optical waveguide element 130 that is optically coupled to the waveguide 2 can be measured by the power meter 40, thus providing an effect that the incident light 10 can be optically coupled to the waveguide 2 easily with high efficiency.

Embodiment 5

Figure 10:
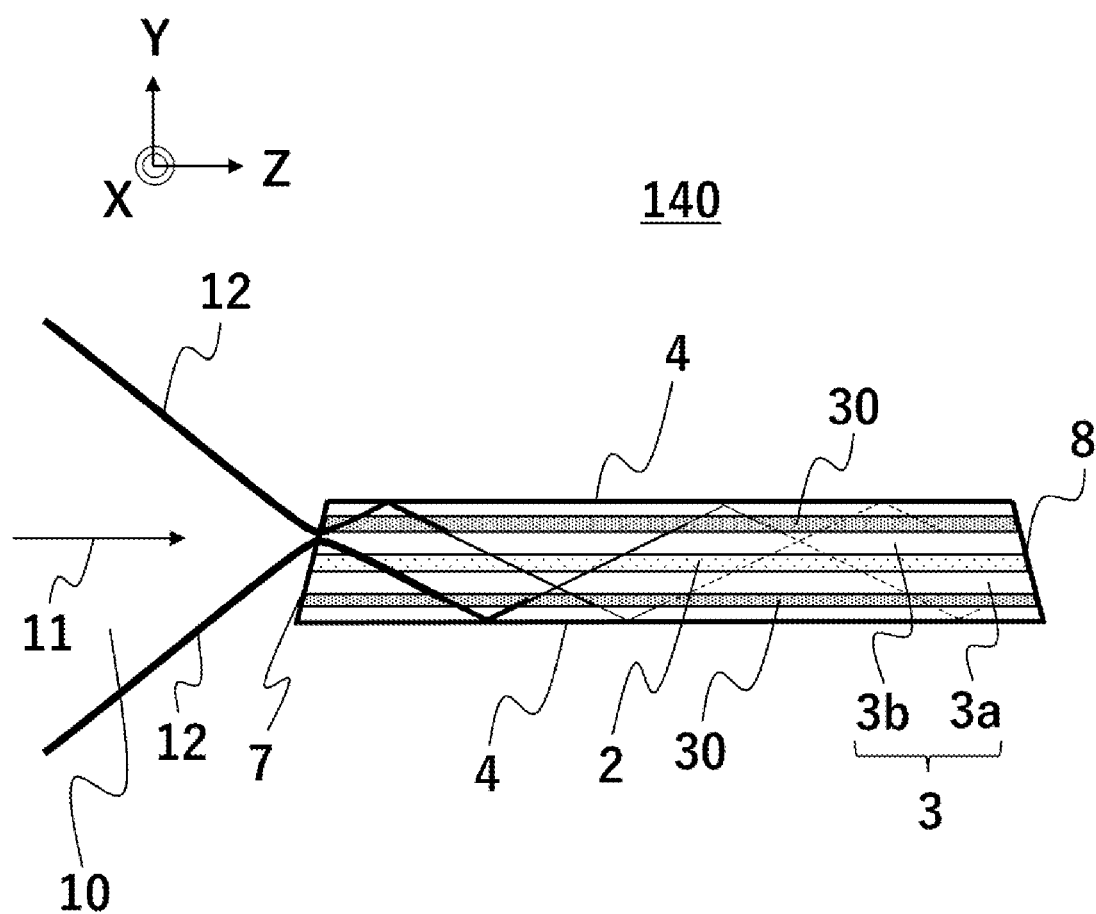
FIG. 10 is a cross-sectional view showing a state in which the optical axis of incident light is being adjusted in the optical waveguide element according to Embodiment 5.

FIG. 10 is a cross-sectional view showing a state in which the optical axis of the incident light 10 in an optical waveguide element 140 is being adjusted in the optical waveguide element 140 and an optical axis adjustment method according to Embodiment 5.

In FIG. 10, the optical waveguide element 140 is composed of a waveguide 2, a clad 3 including a lower clad 3*a* in contact with a lower surface of the waveguide 2 and an upper clad 3*b* in contact with a upper surface of the waveguide 2, an incident end surface 7 provided at one end of the optical waveguide element 140 and parallel to the X-Y plane, an emission end surface 8 provided at the other end of the optical waveguide element 140 and parallel to the X-Y plane, and light absorption layers 30 provided inside the lower clad 3*a* and the upper clad 3*b* respectively and parallel to the X-Z plane, that is, parallel to the waveguide 2. Noted that reflective surfaces 4 are formed on each of the lower surface of the lower clad 3*a* and the upper surface of the upper clad 3*b*. The emission light 15 and the power meter 40 are not shown in FIG. 10 because they are the same as those in Embodiment 1.

In the optical waveguide element 140 according to Embodiment 5, light incident from a side of the clad 3 on the incident end surface 7 is totally reflected at a boundary between the clad 3 and the external air layer or a bonding member, and thus propagates in a zigzag manner between the opposing reflective surfaces 4 of the clad 3.

In the optical waveguide element 140 according to Embodiment 5, the light absorption layers 30 are disposed in each of the lower clad 3*a* in contact with the lower surface of the waveguide 2 and the upper clad 3*b* in contact with the upper surface of the waveguide 2 in the Y direction. The light absorption layers 30 have a function of absorbing the propagating light. The light propagating through the inside of the optical waveguide element 140 is absorbed when passing through the light absorption layers 30, whereby the output of the propagating light decreases every time the propagating light passes through the light absorption layers 30.

Most of the light is absorbed by passing through the light absorption layers 30 multiple times while propagating in a zigzag manner between the opposing reflective surfaces 4 of the clad 3. Therefore, the ratio of the light outputted from a side of the clad 3 on the emission end surface 8 to the light incident on the clad 3 is reduced, whereby it becomes easy to adjust the focal point 14 so as to maximize the output of the emission light 15 measured by the power meter 40.

As described above, in the optical waveguide element 140 and the optical axis adjustment method according to Embodiment 5, since the light absorption layers 30 are disposed inside each of the lower clad 3*a* in contact with the lower surface of the waveguide 2 and the upper clad 3*b* in contact with the upper surface of the waveguide 2, a component of the incident light 10 which is not optically coupled to the waveguide 2 can be absorbed by the light absorption layers 30. Therefore, the component optically coupled to the waveguide 2 by the light propagating through the inside of the optical waveguide element 140 can be measured by the power meter 40, thus providing an effect that the incident light 10 can be optically coupled to the waveguide 2 easily with high efficiency.

Embodiment 6

Figure 11:
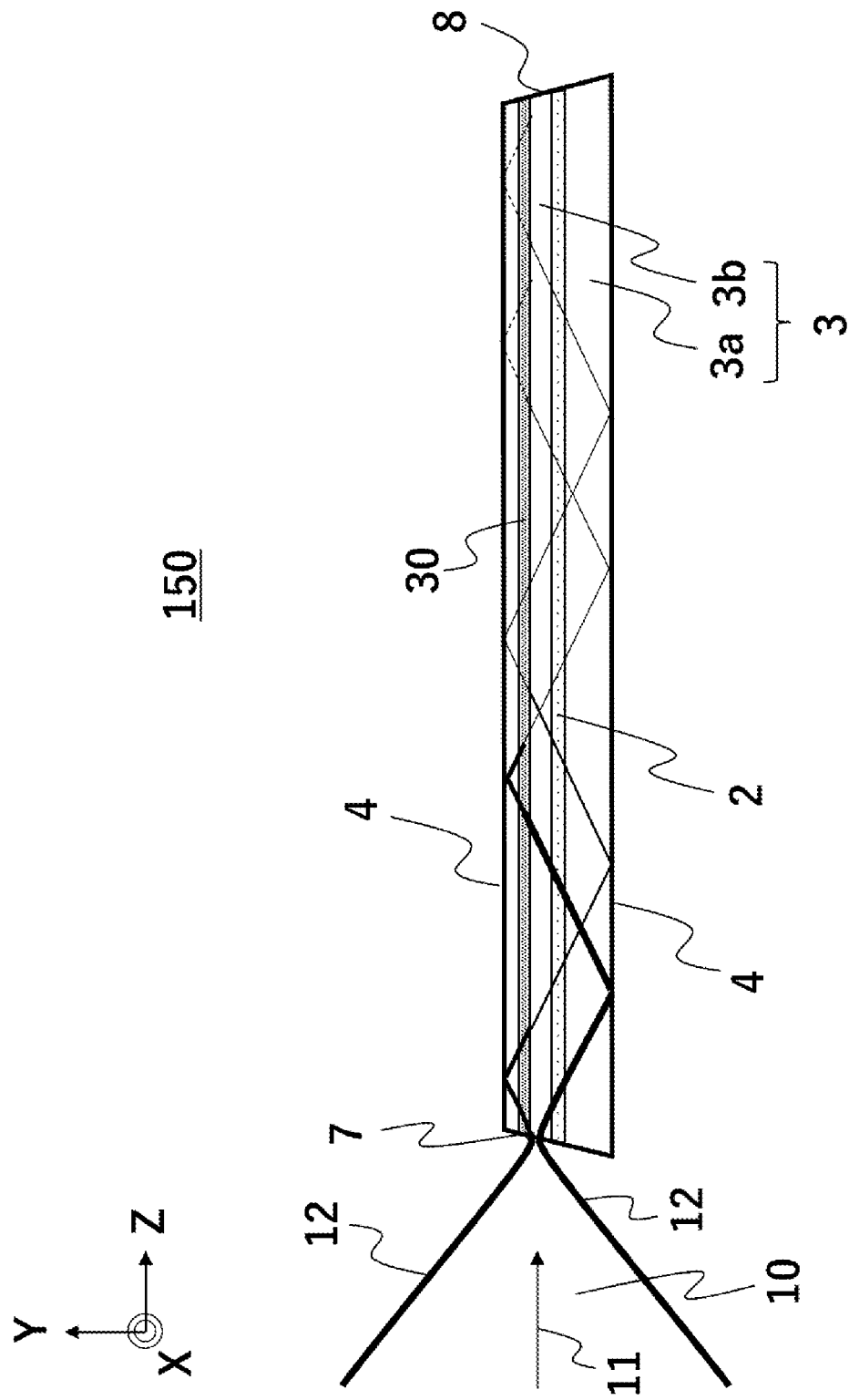
FIG. 11 is a cross-sectional view showing a state in which the optical axis of incident light is being adjusted in the optical waveguide element according to Embodiment 6.

FIG. 11 is a cross-sectional view showing a state in which the optical axis of an incident light 10 in an optical waveguide element 150 is being adjusted in the optical waveguide element 150 and an optical axis adjustment method according to Embodiment 6.

In FIG. 11, the optical waveguide element 150 is composed of a waveguide 2, a clad 3 including a lower clad 3*a* in contact with the lower surface of the waveguide 2 and an upper clad 3*b* in contact with the upper surface of the waveguide 2, an incident end surface 7 provided at one end of the optical waveguide element 150 and parallel to the X-Y plane, an emission end surface 8 provided at the other end of the optical waveguide element 150 and parallel to the X-Y plane, and a light absorption layer 30 provided only in one of the lower clad 3*a* and the upper clad 3*b* and parallel to the X-Z plane. Noted that FIG. 11 illustrates an aspect in which the light absorption layer 30 is disposed inside the upper clad 3*b*. The emission light 15 and the power meter 40 are not shown in FIG. 11 because they are the same as those in Embodiment 1.

Similarly to the optical waveguide element 140 according to Embodiment 5, also in the optical waveguide element 150 according to Embodiment 6, light incident from the clad 3 on the incident end surface 7 side is absorbed every time the light passes through the light absorption layer 30 in the process of propagation while propagating in a zigzag manner between the opposing reflective surfaces 4 of the clad 3.

In the optical waveguide element 150 according to Embodiment 6, the light absorption layer 30 is disposed in only one of the lower clad 3*a* and the upper clad 3*b*, the structure of the optical waveguide element 150 is simplified, thus providing an effect that the optical waveguide element 150 can be easily manufactured.

Noted that since the light absorption layer 30 is disposed in only one of the lower clad 3*a* and the upper clad 3*b*, the light absorption layer 30 may be less efficient in absorbing light propagating through the clad 3 in the optical waveguide element 150 than in the case where the light absorption layers 30 are disposed in both the lower clad 3*a* and the upper clad 3*b* as in the optical waveguide element 140 according to Embodiment 5.

As a measure against such a decrease in the efficiency of light absorption, the length L of the optical waveguide element 150 may be increased in order to increase the ratio of light absorption when the light passes through the light absorption layer 30. In addition, the thickness of the light absorption layer 30 in the Y direction inside the clad 3 may be increased to increase the length in which the light propagating through the inside of the optical waveguide element 150 passes through the light absorption layer 30, that is, the light absorption length. Further, the light absorption rate may be improved by increasing the concentration of the light absorbing member contained in the light absorption layer 30.

With the configuration described above, most of the light propagating through the inside of the clad 3 of the optical waveguide element 150 is absorbed by passing through the light absorption layer 30 multiple times while propagating in a zigzag manner between the opposing reflective surfaces 4 of the clads 3. Therefore, since the ratio of the light outputted from a side of clad 3 on the emission end surface 8 to the light incident on the clad 3 becomes small, it becomes easy to adjust the focal point 14 such that the output of the emission light 15 measured by the power meter 40 is maximum.

As described above, in the optical waveguide element 150 and the optical axis adjustment method according to Embodiment 6, the light absorption layer 30 is disposed only in one of the lower clad 3a in contact with the lower surface of the waveguide 2 and the upper clad 3b in contact with the upper surface of the waveguide 2. Therefore, since a component of the incident light 10 that is not optically coupled to the waveguide 2 can be absorbed by the light absorption layer 30, it becomes possible to measure a component of the light propagating through the inside of the optical waveguide element 150 and optically coupled to the waveguide 2 by the power meter 40. Therefore, in addition to the effect that the incident light 10 can be optically coupled to the waveguide 2 easily with high efficiency, the structure of the optical waveguide element 150 can be simplified, thus providing an effect that the optical waveguide element 150 can be manufactured at low cost.

Embodiment 7

Figure 12:
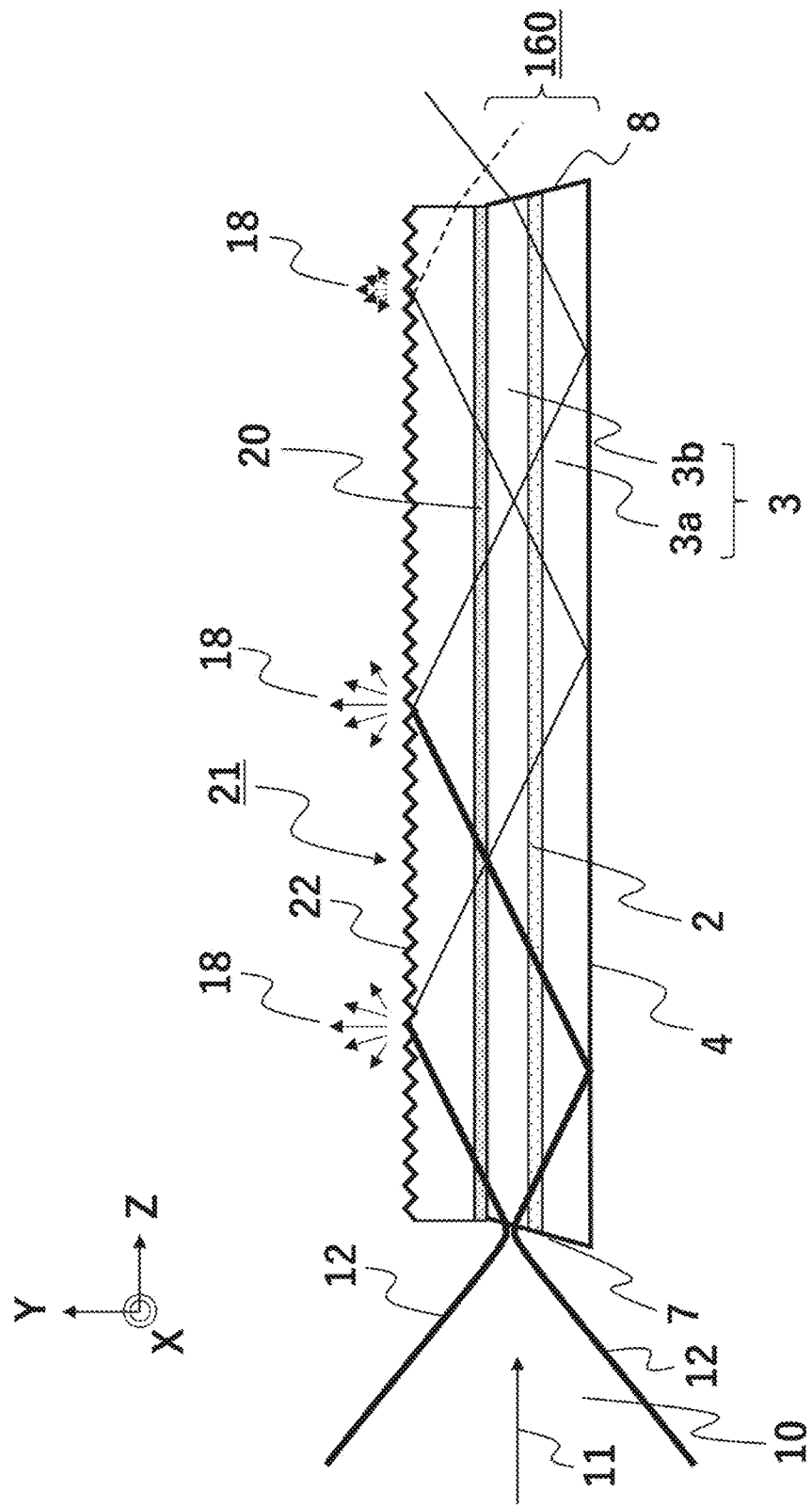
FIG. 12 is a cross-sectional view showing an optical waveguide element and a light guide plate according to Embodiment 7.

FIG. 12 is a cross-sectional view showing an optical waveguide element 160 and a light guide plate 21 in the optical waveguide element 160, the light guide plate 21, and an optical axis adjustment method according to Embodiment 7.

In FIG. 12, the optical waveguide element 160 is composed of a waveguide 2, a clad 3 including a lower clad 3a in contact with the lower surface of the waveguide 2 and a upper clad 3b in contact with the upper surface of the waveguide 2, an incident end surface 7 provided at one end of the optical waveguide element 160 and parallel to the X-Y plane, and an emission end surface 8 provided at the other end of the optical waveguide element 160 and parallel to the X-Y plane.

The light guide plate 21 is provided such that a lower surface of the light guide plate 21 is in contact with a refractive index matching member 20 which is in contact with the upper surface of the upper clad 3b of the optical waveguide element 160 and a rough surface 22 is formed on the upper surface of the light guide plate 21. The emission light 15, the power meter 40, and the imaging device 41 are the same as those in Embodiment 1, and thus are not shown in FIG. 12.

The refractive index matching member 20 is composed of a member having the same refractive index as the clad 3 and the light guide plate 21. An example of the refractive index matching member 20 is a liquid member such as matching oil or the like. When the optical coupling of the incident light 10 to the waveguide 2 is adjusted, the refractive index matching member 20 is not fixed to either the clad 3 or the light guide plate 21. That is, the refractive index matching member 20 is in contact with each of the upper clad 3b and the light guide plate 21 in such a manner that the refractive index matching member 20 can be easily peeled off. Namely, the light guide plate 21 is detachably attached to the optical waveguide element 160 by peeling off the refractive index matching member 20.

Of the light incident from a side of the clad 3 on the incident end surface 7, the light propagating at an angle toward the upper surface direction in the Y-axis is incident on the refractive index matching member 20. The light propagating at an angle toward the lower surface in the Y-axis is totally reflected by the reflective surface 4 of the lower clad 3a, and then enters the refractive index matching member 20 while changing its angle toward the upper surface in the Y-axis.

Since the clad 3, the refractive index matching member 20 and the light guide plate 21 have the same refractive index, the clad 3, the refractive index matching member 20 and the light guide plate 21 do not reflect light at their interfaces, or have low reflectivity, so that most of the light passes through the interfaces. When the light incident on the light guide plate 21 is incident on the rough surface 22 of the light guide plate 21, a part of the light is scattered upward along the Y-axis as scattered light 18 and is output to the outside of the optical waveguide element 160, and a part of the remaining light is reflected.

The reflected light propagates while being reflected in a zigzag manner between the reflective surface 4 and the rough surface 22 of the light guide plate 21. In this way, the incident light 10 can be easily optically coupled to the waveguide 2 with high efficiency by using the power meter 40 and the imaging device 41 in the same manner as the optical axis adjustment method using the optical waveguide element 100 according to Embodiment 1.

The light guide plate 21 on which the rough surface 22 is formed and the refractive index matching member 20 are not fixed to the optical waveguide element 160, whereby the light guide plate 21 and the refractive index matching member 20 may be removed after the adjustment for obtaining optical coupling to the waveguide 2 is completed. That is, it can be said that the light guide plate 21 is detachable.

In a case where the refractive index matching member 20 is the liquid member such as matching oil, after the light guide plate 21 is removed, the refractive index matching member 20 remaining on the optical waveguide element 160 may be wiped off with an organic member. Examples of such an organic member include, but are not limited to, ethanol and acetone. After the adjustment for obtaining the optical coupling to the waveguide 2 is completed, the light guide plate 21 removed from the optical waveguide element 160 can be repeatedly reused for obtaining the optical coupling to another optical waveguide element 160.

In the above description, the aspect that the light guide plate 21 is removed after the adjustment for obtaining optical coupling to the waveguide 2 is completed is explained. However, it goes without saying that the entire configuration including the optical waveguide element 160 shown in FIG. 12 and the light guide plate 21 attached to the optical waveguide element 160 through the refractive index matching member 20 may be used as one optical waveguide element in a state where the light guide plate 21 is attached as it is even after the adjustment.

The upper surface of the upper clad 3b of the optical waveguide element 160 in contact with the refractive index matching member 20 does not need to be processed into a rough surface that causes scattered light in a case where light is incident from the inside of the clad 3. Therefore, since the configuration of the optical waveguide element 160 is simplified, the optical waveguide element 160 can be easily manufactured, and a general-purpose optical waveguide element 160 having no rough surface can also be applied.

As described above, in the optical waveguide element 160 and the light guide plate 21 according to Embodiment 7, in addition to the effects of Embodiment 1, since the light guide plate 21 can be removed after the optical axis adjustment, the light guide plate 21 can be repeatedly reused. Further, since the optical waveguide element 160 having no rough surface can be used, the optical coupling of the optical waveguide element 160 to the waveguide 2 can be realized at low cost, and the optical waveguide element 160 can be manufactured at low cost.

Embodiment 8

Figure 13:
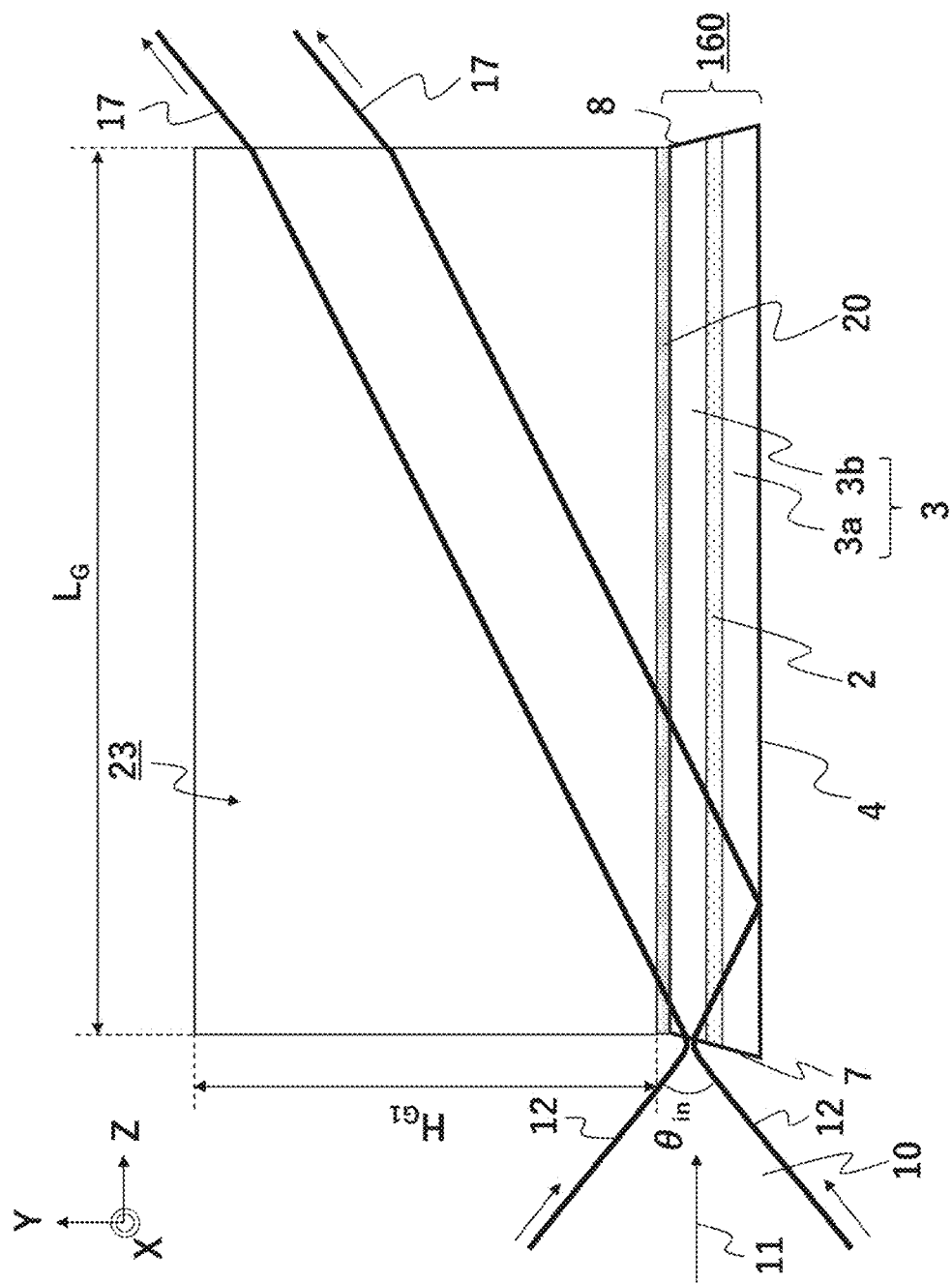
FIG. 13 is a cross-sectional view showing an optical waveguide element and a light guide plate according to Embodiment 8.

FIG. 13 is a cross-sectional view showing the optical waveguide element 160 and a light guide plate 23 in the light guide plate 23 and an optical axis adjustment method according to Embodiment 8.

In FIG. 13, the light guide plate 23 has a large height (thickness) in the Y direction in order that the light incident from a side of the clad 3 on the incident end surface 7 does not enter the upper surface of the clad 3 opposed to the refractive index matching member 20. In other words, the layer thickness of the light guide plate 23 is thick. The optical waveguide element 160, the emission light 15, and the power meter 40 are the same as those in Embodiment 7.

The light incident from the side of the clad 3 on the incident end surface 7 passes through the refractive index matching member 20 and is incident on the light guide plate 23. Where a length of the light guide plate 23 in the Z direction is denoted by $L_G$, an incident beam angle of the incident light is denoted by $\theta_{in}$, and refractive indices of the clad 3, the refractive index matching member 20, and the light guide plate 23 are denoted by n, then, a height $H_{G1}$ of the light guide plate 23 is set so as to satisfy the following Equation (2).

[Equation 2]

$$H_{G1} > L_G \cdot \tan\left(\sin^{-1}\left(\frac{1}{n} \sin \frac{1}{2} \theta_{in}\right)\right) \quad (2)$$

By setting the $H_{G1}$ so as to satisfy Equation (2), the light that has passed through the refractive index matching member 20 and entered the light guide plate 23 is not incident on the upper surface of the light guide plate 23 opposed to the refractive index matching member 20, and thus the incident light always propagates away from the optical waveguide element 160 in the Y direction. Therefore, the light that has passed through the refractive index matching member 20 and entered the light guide plate 23 is output from the X-Y plane of the light guide plate 23, that is, the end surface of the light guide plate 23 on the emission end surface 8 side of the optical waveguide element 160.

The output light follows Snell's law, and further, the angle of the output light in the 6X direction is inclined in the Y direction, and the output light propagates away from the optical waveguide element 160 in the Y direction. Therefore, the light propagating through the light guide plate 23 is output at a sufficient distance in the Y direction with respect to the emission light 15 that is optically coupled to the waveguide 2 and output from the side of the waveguide 2 on the emission end surface 8. That is, the light propagating through the light guide plate 23 is spatially separated from the emission light 15. Therefore, since the power meter 40 can selectively measure only the output of the emission light 15, it becomes possible to maximize the optical coupling by adjusting a lens and a light source (both not shown).

Noted that the length $L_G$ of the light guide plate 23 is preferably the same as the length L of the optical waveguide element 160. The length $L_G$ of the light guide plate 23 may be shorter than the length L of the optical waveguide element 160 because the light incident on the light guide plate 23 from the clad 3 through the refractive index matching member 20 is closer to the incident end surface 7 than to the emission end surface 8 in the Z direction.

As described above, according to the light guide plate 23 and the optical axis adjustment method of Embodiment 8, it is not necessary to process the rough surface such that scattered light is generated in the light guide plate 23, the configuration of the light guide plate 23 is simplified, thus providing an effect that the light guide plate 23 which can be easily manufactured is obtained.

As described above, in the light guide plate 23 and the optical axis adjustment method according to Embodiment 8, in addition to the effects of Embodiment 7, the light guide plate 23 having no rough surface can be used, thus providing an effect that optical coupling of the optical waveguide element 160 to the waveguide 2 can be realized at low cost, and the light guide plate 23 that can be manufactured at low cost can be obtained.

Embodiment 9

Figure 14:
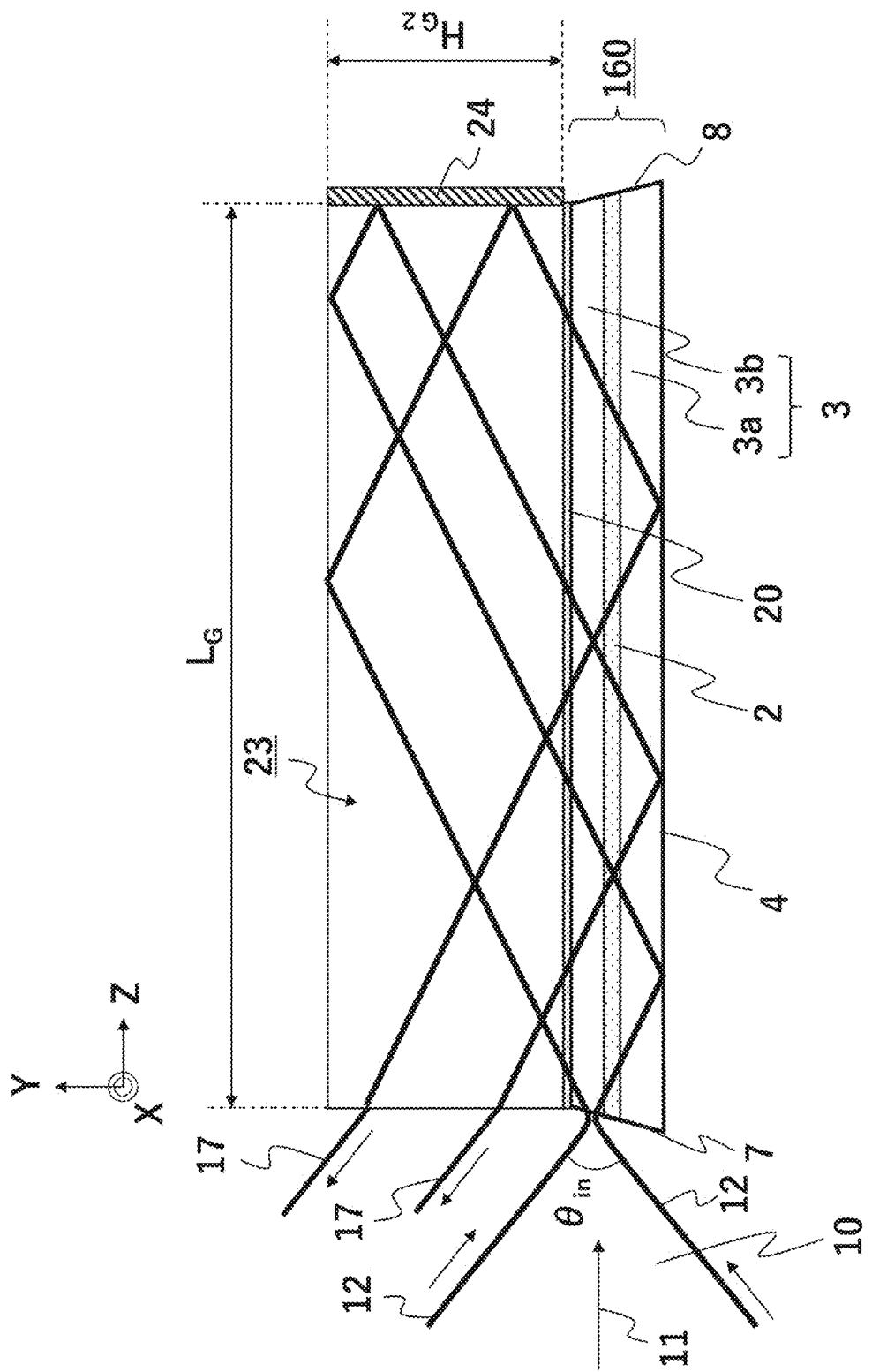
FIG. 14 is a cross-sectional view showing an optical waveguide element and a light guide plate according to Embodiment 9.

FIG. 14 is a cross-sectional view showing the optical waveguide element 160 and a light guide plate 23 in the optical waveguide element 160, the light guide plate 23, and an optical axis adjustment method according to Embodiment 9.

As shown in FIG. 14, a reflector 24 is disposed on the X-Y plane on an emission end surface 8 of the light guide plate 23. In a case where light propagating through the inside of the light guide plate 23 is incident on the reflector 24, the reflector 24 functions to reflect the light into the light guide plate 23. The optical waveguide element 160, the emission light 15, the refractive index matching member 20, and the power meter 40 are the same as those in Embodiment 8.

The light incident from the side of a clad 3 on an incident end surface 7, passing through the refractive index matching member 20, and incident on the light guide plate 23 is incident on an upper surface of the light guide plate 23 opposed to the refractive index matching member 20 and is totally reflected. Since the reflector 24 is disposed on the X-Y plane of the light guide plate 23, that is, on the end surface of the light guide plate 23 on the emission end face 8 side of the optical waveguide element 160, no light is output from the end surface on the emission end surface 8 side of the light guide plate 23.

The light reflected by the reflector 24 passes through the light guide plate 23, the refractive index matching member 20, and the optical waveguide element 160, and is finally output from the emission end surface 8 of the optical waveguide element 160. Therefore, since the power meter 40 can measure only the output of the emission light 15, a lens and a light source (both not shown) can be adjusted to maximize optical coupling.

Since the reflector 24 is disposed on the end surface of the light guide plate 23 on the emission end surface 8 side, a height (thickness) $H_{G2}$ of the light guide plate 23 may be small. For example, it may be one half of the height $H_{G1}$ of the light guide plate according to Embodiment 8. That is, where a length of the light guide plate 23 in the Z direction according to Embodiment 9 is denoted by $L_G$, an incident beam angle of the incident light is denoted by $\theta_{in}$, and refractive indexes of the clad 3, the refractive index matching member 20, and the light guide plate 23 are denoted by the same refractive indexes n, then, the height $H_{G2}$ of the light guide plate 23 may be set to satisfy the following Equation (3).

[Equation 3]

$$H_{G2} > \frac{L_G}{2} \cdot \tan\left(\sin^{-1}\left(\frac{1}{n} \sin \frac{1}{2} \theta_{in}\right)\right) \quad (3)$$

Noted that the reflector 24 may be formed of a dielectric multilayer film, a dielectric single-layer film, a metal film, or the like.

As described above, according to the light guide plate 23 and the optical axis adjustment method of Embodiment 9, the reflector 24 is disposed in the light guide plate 23, thus providing an effect that the light incident on the clad 3 and the light incident on the waveguide 2 can be separated more accurately in the optical waveguide element 160.

As described above, in the light guide plate 23 and the optical axis adjustment method according to Embodiment 9, in addition to the effect of Embodiment 8, the light incident on the clad 3 and the light incident on the waveguide 2 can be spatially separated more accurately, thus providing an effect that the optical coupling of the optical waveguide element 160 to the waveguide 2 can be obtained more easily. In addition, the light guide plate 23 can be configured to be small, thus providing an effect that the light guide plate 23 can be manufactured at low cost.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1a light source
1b lens
2 waveguide
3 clad
4 reflective surface
5, 22 rough surface
6, 61 inclined surface
7 incident end surface
8 emission end surface
10 incident light
11 principal axis of incident light
12 optical axis of beam diameter of incident light
13 part of the incident light
14 focal point
15 emission light
16 principal axis of emission light
17 optical axis of beam diameter of emission light
18 scattered light
20 refractive index matching member
21, 23 light guide plate
24 reflector
30 light absorption layer
40 power meter
41 imaging device
50, 100, 110, 120, 130, 140, 150, 160 optical waveguide element

The invention claimed is:

1. An optical waveguide element comprising:
a waveguide configured to propagate light;
a clad including an upper clad whose lower surface is in contact with one surface of the waveguide and a lower clad whose upper surface is in contact with the other surface of the waveguide;
both side surfaces provided on both sides of the upper clad and the lower clad;
an incident end surface provided at one end of the waveguide and the clad; and
an emission end surface provided at the other end of the waveguide and the clad, wherein
one of a flat upper surface of the upper clad and a flat lower surface of the lower clad is formed in a uniform inclined surface with respect to the waveguide, and the other is formed in a uniform parallel surface with respect to the waveguide, wherein
a thickness of the clad in a direction perpendicular to the waveguide is thinner on a side of the emission end surface than on a side of the incident end surface, and a distance between the flat upper surface of the upper clad and the flat lower surface of the lower clad uniformly and gradually decreases from the incident end surface to the emission end surface.

2. An optical axis adjustment method comprising:
a step of condensing light from a light source by a lens on the incident end surface of the optical waveguide element according to claim 1;
a step of measuring an output emitted from the emission end surface of the optical waveguide element by a power meter; and
a step of adjusting a position of a focal point and an incident beam angle of the condensed incident light so as to increase the output by adjusting a position and an angle of one or both of the light source and the lens.

3. The optical waveguide element according to claim 1, wherein the incident end surface and the emission end surface are each inclined with respect to the waveguide.

4. An optical waveguide element comprising:
a waveguide configured to propagate light;
a clad including an upper clad whose lower surface is in contact with one surface of the waveguide and a lower clad whose upper surface is in contact with the other surface of the waveguide;
both side surfaces provided on both sides of the upper clad and the lower clad;
an incident end surface provided at one end of the waveguide and the clad; and
an emission end surface provided at the other end of the waveguide and the clad, wherein both a flat upper surface of the upper clad and a flat lower surface of the lower clad are formed in uniform inclined surfaces with respect to the waveguide, wherein a thickness of the clad in a direction perpendicular to the waveguide is thinner on a side of the emission end surface than on a side of the incident end surface, and a distance between the flat upper surface of the upper clad and the flat lower surface of the lower clad uniformly and gradually decreases from the incident end surface to the emission end surface.

5. The optical waveguide element according to claim 4, wherein an inclination angle θg between the inclined surface formed by the flat upper surface of the upper clad and the one surface of the waveguide is equal to the inclination angle θg between the inclined surface formed by the flat lower surface of the lower clad and the other surface of the waveguide.

6. The optical waveguide element according to claim 5, wherein the both side surfaces of the upper clad and the lower clad are flat inclined surfaces inclined at the inclination angle θg with respect to a principal axis of incident light from the side of the incident end surface toward the side of the emission end surface.

7. The optical waveguide element according to claim 4, wherein the incident end surface and the emission end surface are each inclined with respect to the waveguide.

8. The optical waveguide element according to claim 4, wherein the both side surfaces of the waveguide and the clad that are flat surfaces are inclined surfaces inclined with respect to the waveguide.

\* \* \* \* \*